US010795508B2

(12) United States Patent
Han et al.

(10) Patent No.: US 10,795,508 B2
(45) Date of Patent: Oct. 6, 2020

(54) MOBILE TERMINAL AND METHOD FOR CONTROLLING THE SAME

(71) Applicant: LG ELECTRONICS INC., Seoul (KR)

(72) Inventors: Dongsu Han, Seoul (KR); Soseul Jin, Seoul (KR); Jungwhan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/535,015

(22) Filed: Aug. 7, 2019

(65) Prior Publication Data
US 2020/0159368 A1 May 21, 2020

(30) Foreign Application Priority Data

Nov. 20, 2018 (KR) .................. 10-2018-0143821

(51) Int. Cl.
G06F 3/042 (2006.01)
G06F 21/32 (2013.01)
G06F 3/01 (2006.01)

(52) U.S. Cl.
CPC ............ *G06F 3/0425* (2013.01); *G06F 3/017* (2013.01); *G06F 21/32* (2013.01); *G06F 2221/2149* (2013.01)

(58) Field of Classification Search
CPC ........ G06F 3/0425; G06F 21/32; G06F 3/017; G06F 2221/2149
See application file for complete search history.

(56) References Cited

U.S. PATENT DOCUMENTS

| 8,560,004 | B1 | 10/2013 | Tsvetkov et al. |
| 9,245,100 | B2 * | 1/2016 | Marco ..................... G06F 3/017 |
| 2017/0293749 | A1 | 10/2017 | Baek et al. |
| 2018/0089409 | A1 * | 3/2018 | Zhang ................. G06K 9/0002 |

(Continued)

FOREIGN PATENT DOCUMENTS

| CN | 103019388 | | 4/2013 | |
| CN | 104424415 A | * | 3/2015 | ............. G06F 21/81 |

(Continued)

OTHER PUBLICATIONS

Korean Intellectual Property Office Application No. 10-2018-0143821, Office Action dated Oct. 17, 2019, 7 pages.
(Continued)

Primary Examiner — Vinh T Lam
(74) Attorney, Agent, or Firm — Lee Hong Degerman Kang & Waimey

(57) ABSTRACT

The present disclosure relates to a mobile terminal including a temperature sensor and a control method thereof. A mobile terminal according to the present disclosure may include a main body, a first sensor disposed on the main body and configured to sense a temperature of an object located in the vicinity of the main body, a second sensor disposed on the main body and configured to acquire an image of the object, the second sensor having either one of an active state and an inactive state in a locked state, and a controller configured to operate the first sensor in an active mode to sense the temperature of the object in the locked state in which the second sensor is operated in an inactive state.

19 Claims, 18 Drawing Sheets

(56) References Cited

U.S. PATENT DOCUMENTS

2018/0101711 A1    4/2018  D'Souza et al.
2019/0227602 A1*   7/2019  Trim ...................... G06F 3/044

FOREIGN PATENT DOCUMENTS

| CN | 105592187 A | * | 5/2016 | ............ G06F 21/32 |
| CN | 105787328 A | * | 7/2016 | ............ G06F 21/32 |
| CN | 109255219 A | * | 1/2019 | ............ G06F 21/32 |
| KR | 1020130120599 | | 11/2013 | |
| KR | 1020170035240 | | 3/2017 | |
| KR | 1020180086940 | | 8/2018 | |

OTHER PUBLICATIONS

European Patent Office Application Serial No. 19193177.3, Search Report dated Mar. 9, 2020, 9 pages.

\* cited by examiner (a)

(b)

(c)

(a)

(b)

(a)

(b)

(a)

(b)

(c)

(a)

(b)

(c)

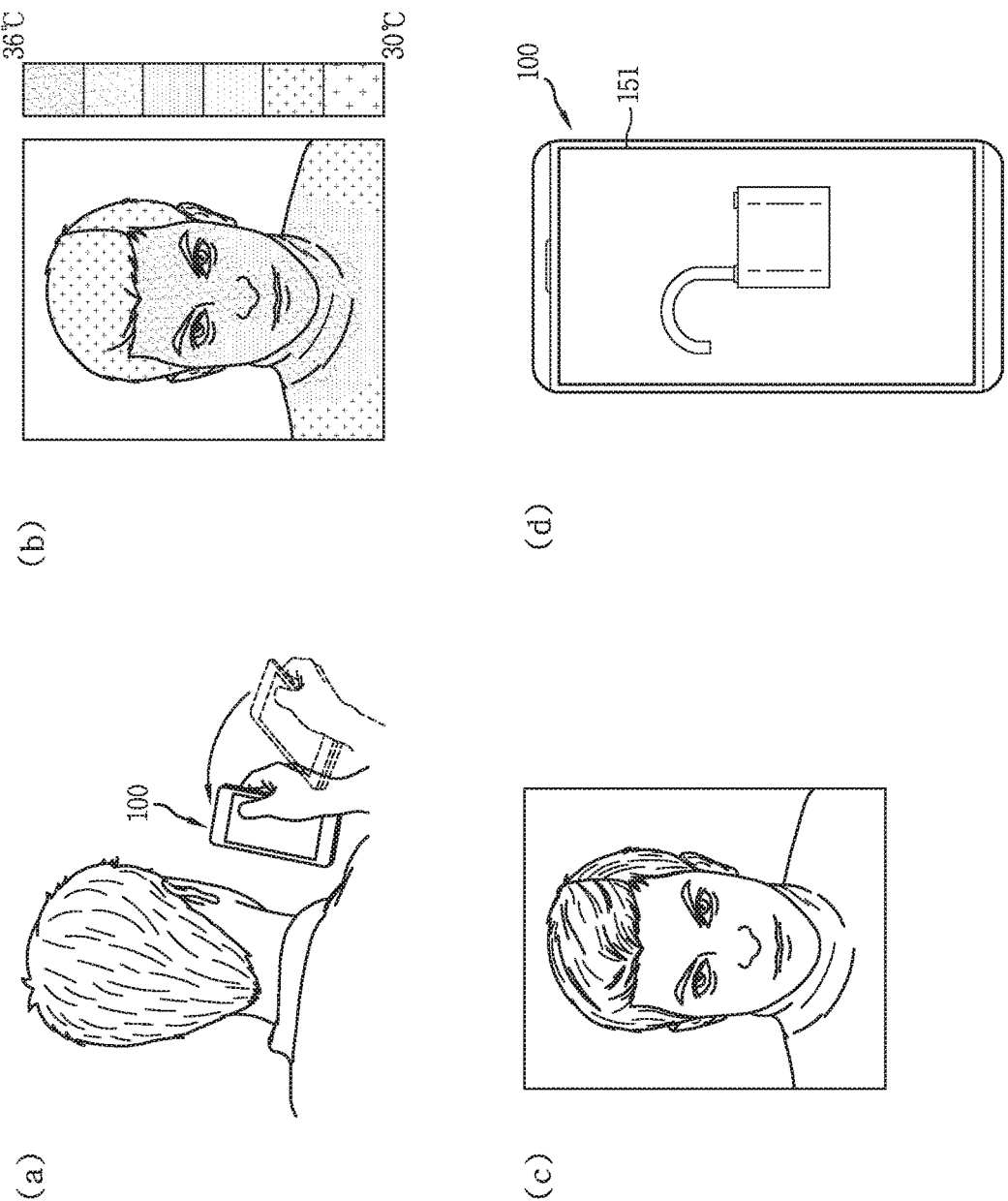

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2018-0143821, filed on Nov. 20, 2018, the contents of which are incorporated by reference herein in its entirety.

BACKGROUND OF THE INVENTION

1. Field of the Invention

The present disclosure relates to a mobile terminal including a temperature sensor and a control method thereof.

2. Description of the Related Art

Terminals may be divided into mobile/portable terminals and stationary terminals according to their mobility. Furthermore, mobile terminals may be divided into handheld terminals and vehicle mounted terminals according to whether or not it can be directly carried by a user.

The functions of mobile terminals have been diversified. For example, the functions may include data and voice communication, photographing and video shooting through a camera, voice recording, playing a music file through a speaker system, and displaying an image or video on a display unit. Some terminals further include an electronic game play function or perform a multimedia player function. In particular, in recent years, mobile terminals may receive multicast signals that provide visual content such as broadcast, video or television programs.

As it becomes multifunctional, for example, such a terminal is allowed to capture still images or moving images, play music or video files, play games, receive broadcast and the like, so as to be implemented as an integrated multimedia player.

On the other hand, in recent years, as the functions of terminals have been diversified, financial information and privacy information are stored in terminals, the importance of security for terminals is gradually increasing.

Therefore, in addition to maintaining terminal security through a conventional password and touch pattern input, in recent years, a biometric authentication method of authenticating a user using the user's biometric information (e.g., fingerprint, iris, face, etc.) with a higher level of security has been actively used.

SUMMARY OF THE INVENTION

An object of the present disclosure is to provide a mobile terminal capable of more conveniently performing user authentication using a user's biometric information and a control method thereof.

More specifically, the present disclosure provides a mobile terminal capable of performing user authentication by perceiving a user's intention even when there is no additional user input to the terminal in order to perform user authentication and a control method thereof.

Furthermore, another object of the present disclosure is to provide a mobile terminal capable of performing user authentication using user biometric information while saving terminal power consumption and a control method thereof.

In addition, still another object of the present disclosure is to provide a mobile terminal capable of further enhancing security through a user authentication method that lowers the probability of forgery and falsification of user biometric information and a control method thereof.

A mobile terminal according to the present disclosure may include a main body, a first sensor disposed on the main body and configured to sense a temperature of an object located in the vicinity of the main body, a second sensor disposed on the main body and configured to acquire an image of the object, the second sensor having either one of an active state and an inactive state in a locked state, and a controller configured to operate the first sensor in an active mode to sense the temperature of the object in the locked state in which the second sensor is operated in an inactive state, wherein the controller operates the second sensor in an active state and controls the second sensor to acquire an image of the object through the second sensor when the temperature of the object sensed through the first sensor in the locked state satisfies a preset temperature condition, and switches the locked state to the unlocked state when the acquired image is an image satisfying a condition for switching the locked state to the unlocked state.

According to an embodiment, the mobile terminal may further include a touch screen disposed on a front surface of the main body, wherein the controller controls the operating status of the first sensor to be in an active state even while the touch screen is in an inactive state, and the first sensor senses the temperature of the object when the object is located within a first sensing area of the first sensor.

According to an embodiment, the operating status of the second sensor in the locked state may vary depending on whether the temperature of the object sensed through the first sensor in the locked state satisfies the preset temperature condition.

According to an embodiment, the operating status of the second sensor in the locked state may maintain the inactive state while the first sensor is operated in an active state, and switch from the inactive state to the active state when the temperature of the object satisfies the preset temperature condition.

According to an embodiment, the first sensing region of the first sensor and the second sensing region of the second sensor may overlap with each other at least in part, and the second sensor may acquire an image of at least part of the object located in an area overlapping with the second sensing area within the object located in the first sensing area.

According to an embodiment, when the object satisfying the preset temperature condition is sensed through the first sensor, the controller may acquire the shape of the object corresponding to an area in which the temperature of the object is sensed, and perform different controls depending on the acquired shape of the object.

According to an embodiment, when the acquired shape of the object corresponds to the shape of a preset object to be authenticated so as to perform authentication in order to switch the locked state to the unlocked state, the controller may control the operating status of the second sensor to acquire an image of the object through the second sensor.

According to an embodiment, the mobile terminal may further include a touch screen disposed on a front surface of the main body, wherein the controller controls the type of screen displayed on the touch screen in a different way in the unlocked state according to the acquired shape of the object.

According to an embodiment, the first sensor may include a plurality of temperature sensor pixels, and at least part of the plurality of temperature sensor pixels may continuously maintain an active state in the locked state.

According to an embodiment, the controller may determine the number and location of pixels to be activated among the plurality of temperature sensor pixels according to the type of information to be acquired through the first sensor in the locked state.

According to an embodiment, the number of temperature sensor pixels activated to acquire the shape information and temperature information of the object may be larger than that of temperature sensor pixels activated to acquire the temperature information of the object.

A mobile terminal according to the present disclosure may include a main body, a touch screen disposed on a front side of the main body, a first sensor disposed on the front side and configured to sense a temperature of an object located in the vicinity of the main body in a locked state, a second sensor disposed in proximity to the first sensor to have either one of an active state and an inactive state in the locked state and configured to acquire an image of the object in the locked state, and a controller configured to switch the locked state to an unlocked state when the image acquired through the second sensor corresponds to pre-registered user authentication information, wherein the first sensor senses the temperature of the object located in the vicinity of the main body while the second sensor is operated in the inactive state in the locked state, and the second sensor switches from the inactive state to the active state to acquire an image of the object in the locked state when the temperature of the object satisfies a preset temperature condition as a result of sensing through the first sensor.

According to an embodiment, the mobile terminal may further include a third sensor configured to sense a motion speed of the main body, wherein when the temperature of the object satisfies a preset temperature condition as a result of sensing through the first sensor in the locked state, the controller determines whether a motion satisfying a preset speed condition is sensed by the third sensor, and controls the second sensor to acquire an image of the object from the second sensor when a motion satisfying the preset speed condition is sensed as a result of the determination.

According to an embodiment, the first sensor may include a plurality of temperature sensor pixels, and the second sensor may include a plurality of image sensor pixels, and each of the plurality of temperature sensor pixels may be disposed between the plurality of image sensor pixels.

A method of controlling a mobile terminal according to the present disclosure may include sensing a temperature of an object located in the vicinity of a terminal body using a temperature sensor in a locked state, operating an image sensor in an active mode to acquire an image of the object in the locked state when the temperature of the object satisfies a preset temperature condition, and switching the locked state to an unlocked state when the image acquired through the image sensor corresponds to preset user authentication information, wherein the image sensor is operated in either one of an active mode and a sleep mode in the locked state, and the temperature of the object is sensed through the temperature sensor while the image sensor is operated in a sleep mode, and the image sensor is operated in the active mode in the sleep mode when the temperature of the object satisfies the preset temperature condition.

As described above, according to a mobile terminal in accordance with the present disclosure and a control method thereof, it may be possible to sense a user's body located in the vicinity of a terminal body through a temperature sensor operating in an active state in a locked state. When the user's body is sensed, a process for releasing a locked state is carried out. Therefore, according to the present disclosure, a process for releasing a locked state may be carried out with no user's operation of manipulating the terminal or moving the terminal to release the locked state. As a result, according to a mobile terminal in accordance with the present disclosure and a control method thereof, a user may control the locked state of the terminal only by locating the user's body around the terminal body, thereby enhancing user convenience.

Moreover, a mobile terminal in accordance with the present disclosure and a control method thereof may sense a user body in the vicinity of the terminal, and then activate an image sensor for acquiring an image corresponding to the user's body, thereby reducing power consumption compared to when the image sensor is continuously activated.

Moreover, according to a mobile terminal in accordance with the present disclosure and a control method, it may be possible to recognize whether a user's body part is a body part used for user authentication based on a shape of a region where a temperature corresponding to the user's body is sensed. Therefore, an image sensor may be selectively activated according to the recognition result. As a result, even when the user's body is sensed, it may be possible to reduce unnecessary power consumption by deactivating the image sensor when the sensed user's body is not a body part for user authentication.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings:

FIGS. 1B and 10 are conceptual views illustrating an example in which a mobile terminal associated with the present disclosure is seen from different directions;

FIGS. 8A and 8B are conceptual views for explaining a method of controlling a locked state using a temperature sensor and an acceleration sensor according to the present disclosure;

DETAILED DESCRIPTION OF THE INVENTION

Figure 1A:
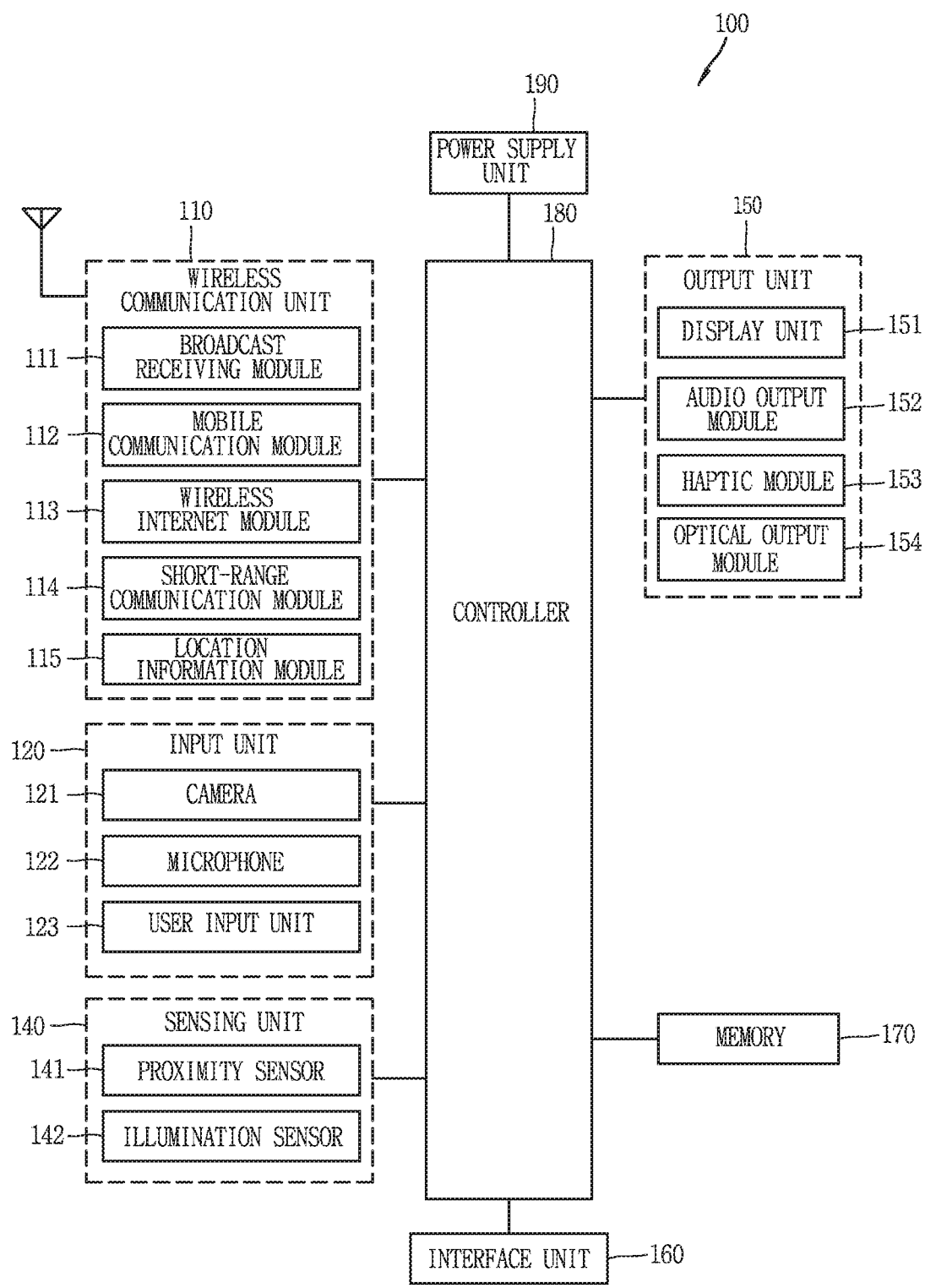
FIG. 1A is a block diagram for explaining a mobile terminal associated with the present disclosure.

Hereinafter, preferred embodiments of the present disclosure will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present disclosure, moreover, the detailed description will be omitted when a specific description for publicly known technologies to which the invention pertains is judged to obscure the gist of the present disclosure. The accompanying drawings are used to help easily understand the technical idea of the present disclosure and it should be understood that the idea of the present disclosure is not limited by the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. On the contrary, in case where an element is "directly connected" or "directly linked" to another element, it should be understood that any other element is not existed therebetween.

A singular representation may include a plural representation as far as it represents a definitely different meaning from the context.

Terms "include" or "has" used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultrabooks, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers, digital signages, and the like, excluding a case of being applicable only to the mobile terminals.

Figure 1B:
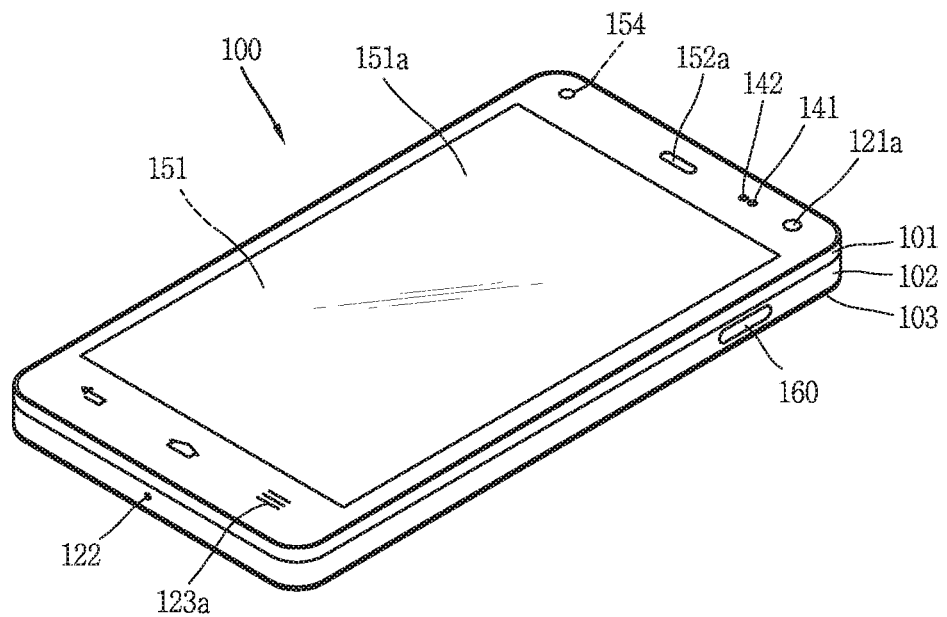

Referring to FIGS. 1A through 10, FIG. 1A is a block diagram for explaining a mobile terminal associated with the present disclosure, and FIGS. 1B and 10 are conceptual views illustrating an example in which the mobile terminal associated with the present disclosure is seen from different directions.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and an external server. In addition, the wireless communication unit 110 may include one or more modules for connecting the mobile terminal 100 to one or more networks.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). The mobile terminal 100 may be configured to utilize information obtained from sensing unit 140, and in particular, information obtained from one or more sensors of the sensing unit 140, and combinations thereof.

The output unit 150 may be configured to output an audio signal, a video signal or a tactile signal. The output unit 150 may include a display unit 151, an audio output module 152, a haptic module 153, an optical output unit 154 and the like. The display unit 151 may have an inter-layered structure or an integrated structure with a touch sensor in order to facilitate a touch screen. The touch screen may provide an output interface between the mobile terminal 100 and a user, as well as functioning as the user input unit 123 which provides an input interface between the mobile terminal 100 and the user.

The interface unit 160 serves as an interface with various types of external devices that can be coupled to the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

In addition, the memory 170 stores data that support various functions of the mobile terminal 100. The memory 170 is typically implemented to store data to support various functions or features of the mobile terminal 100. For instance, the memory 170 may be configured to store application programs executed in the mobile terminal 100, data or instructions for operations of the mobile terminal 100, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

Furthermore, the controller 180 may control at least part of the components illustrated in FIG. 1A, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Furthermore, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and/or a terrestrial channel. At least two broadcast receiving modules 111 may be provided in the portable electronic device 100 to simultaneously receive at least two broadcast channels or switch the broadcast channels.

The mobile communication module 112 may transmit/receive wireless signals to/from at least one of network entities, for example, a base station, an external terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

The wireless signals may include audio call signal, video (telephony) call signal, or various formats of data according to transmission/reception of text/multimedia messages.

The wireless Internet module 113 refers to a module for supporting wireless Internet access, and may be built-in or externally installed on the mobile terminal 100. The wireless Internet module 113 may transmit and/or receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks. The short-range communication module 114 denotes a module for short-range communications.

Here, the another mobile terminal 100 may be a wearable device, for example, a smart watch, smart glasses or a head mounted display (HMD), which is able to exchange data with the mobile terminal 100 (or to link data with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a WiFi module, or both. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information associated with a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

Next, the input unit 120 may be configured to provide an audio or video signal (or information) input to the mobile terminal or information input by a user to the mobile terminal. For the input of the audio information, the mobile terminal 100 may include one or a plurality of cameras 121. The camera 121 processes a image frame, such as still picture or video, acquired by an image sensor in a video phone call or image capturing mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. As another example, the cameras 121 may be located in a stereoscopic arrangement to acquire left and right images for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

On the other hand, the sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may also be categorized as a proximity sensor.

On the other hand, for the sake of brief explanation, a behavior in which the pointer is positioned to be proximate onto the touch screen without contact will be referred to as "proximity touch," whereas a behavior in which the pointer substantially comes into contact with the touch screen will be referred to as "contact touch." For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving state, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

For an example, the touch sensor may be configured to convert changes of pressure applied to a specific part of the display unit 151 or a capacitance occurring from a specific part of the display unit 151, into electric input signals. The touch sensor may be configured to detect a position, an area where a touch object applying a touch onto the touch screen is touched on the touch sensor, a pressure at the time of touch, a capacitance at the time of touch, and the like. Here, the touch object body may be a finger, a touch pen or stylus pen, a pointer, or the like as an object through which a touch is applied to the touch sensor.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swype touch, a hovering touch, and the like.

An ultrasonic sensor may be configured to recognize position information relating to a sensing object by using ultrasonic waves. On the other hands, the controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

On the other hand, the camera 121 constructing the input unit 120 may be a type of camera sensor. The camera sensor may include at least one of a photo sensor (or image sensor) and a laser sensor.

The camera 121 and the laser sensor may be combined to sense a touch of a sensing object to a 3D stereoscopic image. The photo sensor may be laminated on the display device. The photo sensor may be configured to scan a motion of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may display (output) information processed in the mobile terminal 100. For example, the display unit 151 may display execution screen information of an application program driven in the mobile terminal 100 or user interface (UI) and graphic user interface (GUI) information in response to the execution screen information.

Furthermore, the display unit 151 may also be implemented as a stereoscopic display unit for displaying stereoscopic images.

The stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. Also, the audio output module 152 may also provide audible output signals associated with a particular function (e.g., a call signal reception sound, a message reception sound, etc.) carried out by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be configured to transmit tactile effects through a user's direct contact, or a user's muscular sense using a finger or a hand. Two or more haptic modules 153 may be provided according to the particular configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be ended as the mobile terminal senses a user's event checking.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

On the other hand, the identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identification device") may take the form of a smart card. Accordingly, the identifying device may be connected with the electronic device 100 via the interface unit 160.

Furthermore, when the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Such various command signals or power inputted from the cradle may operate as signals for recognizing that the mobile terminal 100 has accurately been mounted to the cradle.

The memory 170 can store programs to support operations of the controller 180 and store input/output data (for example, phonebook, messages, still images, videos, etc.). The memory 170 may store data associated with various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

On the other hand, as described above, the controller 180 may typically control the general operations of the mobile terminal 100. For example, the controller 180 may set or release a locked state for restricting a user from inputting a control command with respect to applications when a state of the mobile terminal meets a preset condition.

Furthermore, the controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the electronic device 100 under the control of the controller 180. The power supply unit 190 may include a battery, which is typically rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

For another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Figure 1C:
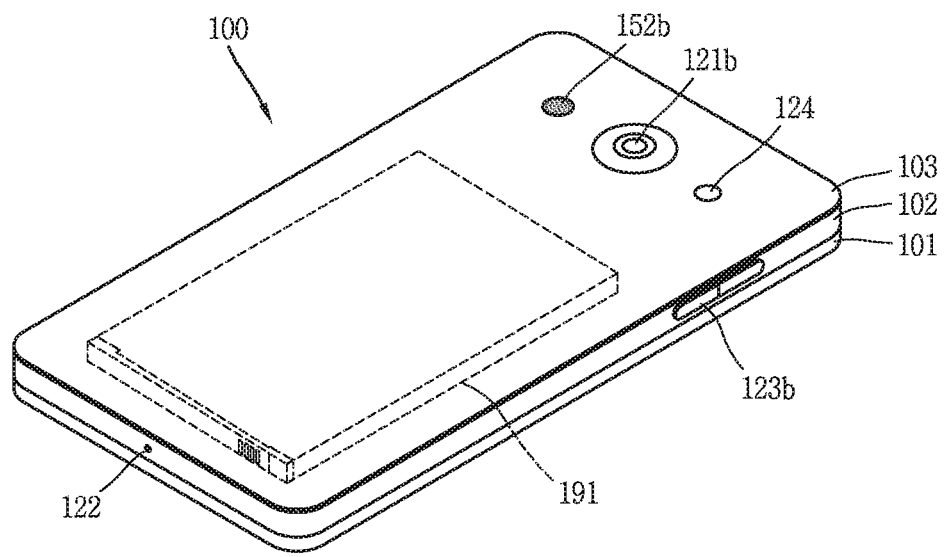

Referring to FIGS. 1B and 1C, the mobile terminal 100 disclosed herein may be provided with a bar-type terminal body. However, the present disclosure may not be necessarily limited to this, and may be also applicable to various structures such as a watch type, a clip type, a glasses type, a folder type in which two or more bodies are coupled to each other in a relatively movable manner, a slide type, a swing type, a swivel type, and the like. The description in association with a specific type of mobile terminal or on a specific type of mobile terminal will be also typically applied to another type of mobile terminal.

Here, the terminal body may be understood as a conception which indicates the mobile terminal 100 as at least one assembly.

The mobile terminal 100 may include a case (for example, a frame, a housing, a cover, etc.) constituting the appearance thereof. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproof portion may include a waterproof member provided between the window 151a and the front case 101, between the front case 101 and the rear case 102, or between the rear case 102 and the back cover 103, to hermetically seal an inner space when those cases are coupled to each other.

The mobile terminal 100 may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 10.

However, the foregoing configuration may not be necessarily limited to the arrangement. The foregoing configuration may be excluded, substituted or disposed on another surface if necessary. For example, the first manipulation unit 123a may not be disposed on the front surface of the terminal body, and the second audio output module 152b may be disposed on the side surface other than the rear surface of the terminal body.

The display unit 151 may display (output) information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

Furthermore, the display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

On the other hand, the touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 may output light for indicating an event generation. Examples of the event generated in the electronic device 100 may include a message reception, a call signal reception, a missed call, an alarm, a schedule notice, an email reception, information reception through an application, and the like. When a user's event check is sensed, the controller 180 may control the optical output unit 154 to end the output of light.

The first camera 121a may process video frames such as still or moving images acquired by the image sensor in a video call mode or a capture mode. The processed video frames may be displayed on the display unit 151 or stored in the memory 170.

The first and second manipulation units 123a, 123b are examples of the user input unit 123, which may be manipulated by a user to input a command for controlling the operation of the mobile terminal 100. The first and second manipulation units 123a, 123b may employ any method if it is a tactile manner allowing the user to perform manipulation with a tactile feeling such as touch, push, scroll or the like. In addition, the first and second manipulation units 123a, 123b may also employ a method of allowing the user to perform manipulation without a tactile feeling through a proximity touch, a hovering touch, or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap with the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a fingerprint recognition sensor for recognizing a user's fingerprint, and the controller 180 may use fingerprint information sensed through the finger recognition sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 (refer to FIG. 1A) for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may link with the display unit 151 to extend the function of the mobile terminal 100. Another example of the accessory may be a touch pen for assisting or extending a touch input onto a touch screen.

On the other hand, the mobile terminal according to the present disclosure may be provided with a sensor capable of sensing a temperature of a user body to sense a user's body temperature using the sensor and perform various controls related to the terminal based on the sensed result.

Figure 2:
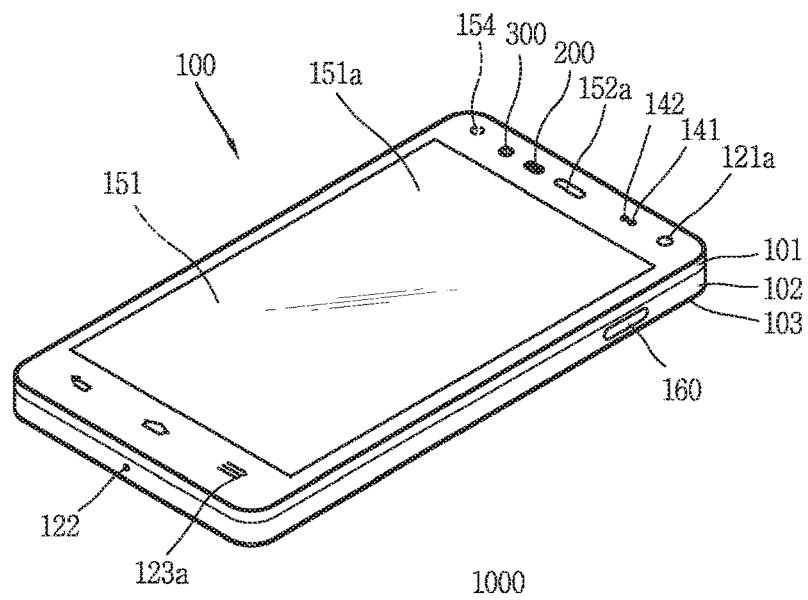
FIGS. 2 and 3 are conceptual views for explaining a sensor used to sense a user body temperature in the present disclosure.
Figure 2:
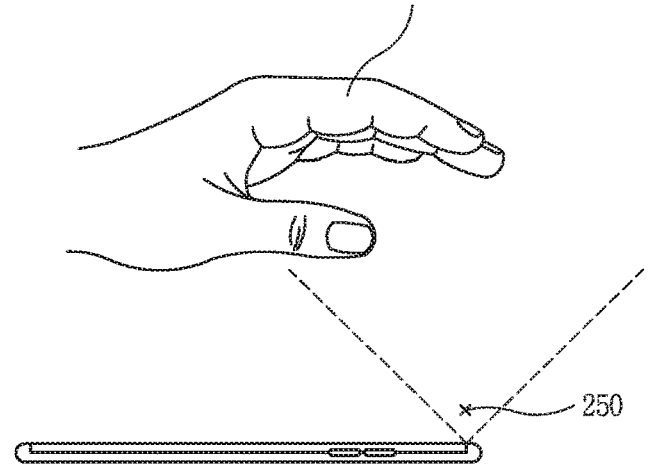
Figure 2:
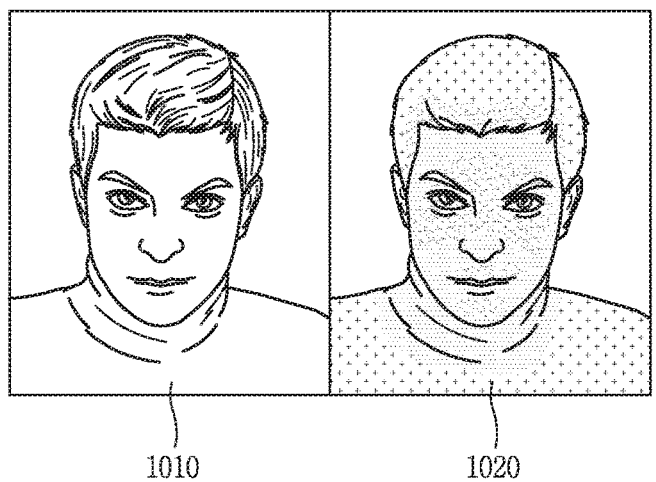
Figure 3:
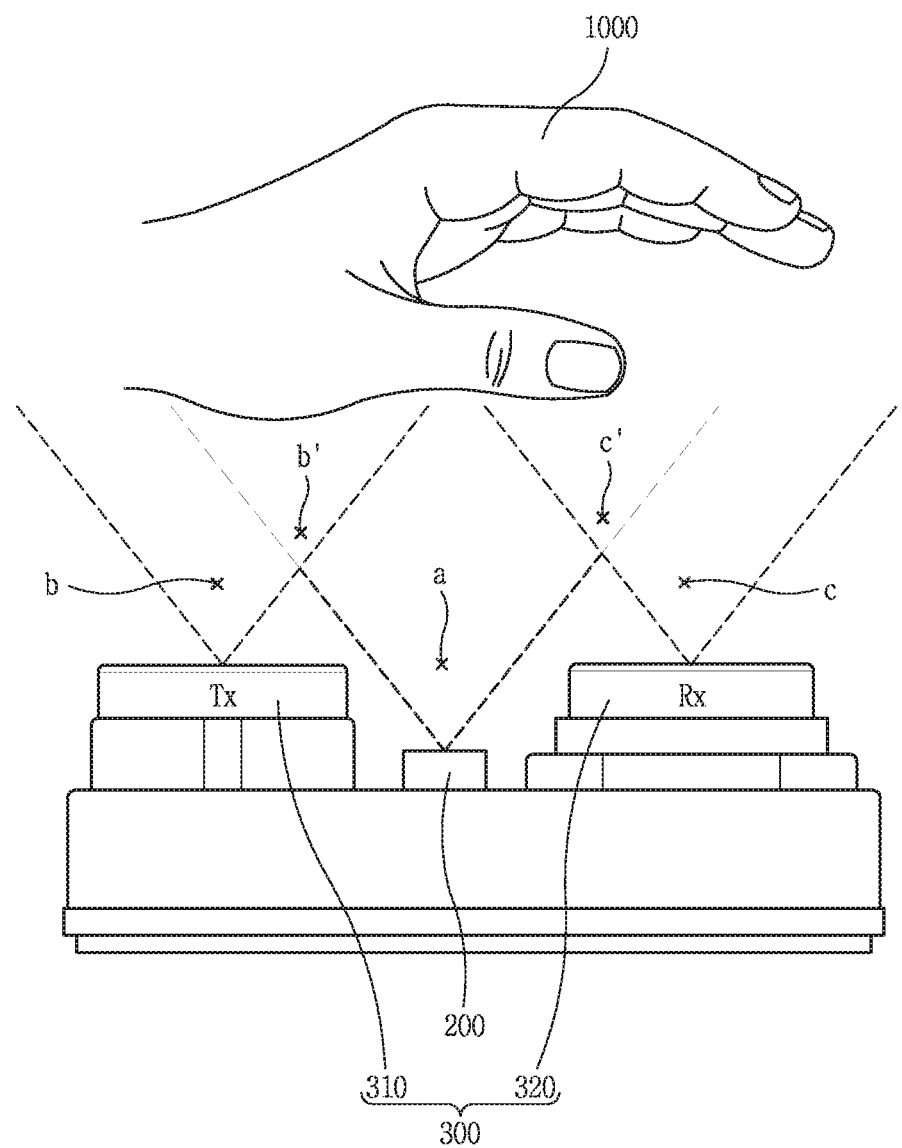

Hereinafter, a method of sensing a temperature of a user body to perform various functions will be described in detail with reference to the accompanying drawings. FIGS. 2 and 3 are conceptual views for explaining a sensor used to sense a user body temperature in the present disclosure.

As illustrated in (a) of FIG. 2, the main body 100 of the mobile terminal according to the present disclosure is provided with a temperature sensor 200 for sensing a temperature of an object located in the vicinity of the main body 100.

The temperature sensor 200 may be provided on at least one of a front surface, a side surface, and a rear surface of the terminal body 100. According to the present specification, for the sake of convenience of explanation, although the temperature sensor 200 is illustrated as being disposed on a front surface of the main body 100 for convenience of description, it will be apparent to those skilled in the art that the following description of the present disclosure is not limited to the location of the temperature sensor 200.

The temperature sensor 200 according to the present disclosure is a sensor that senses the temperature of an object located in the vicinity of the temperature sensor 200, and may be referred to as a temperature sensor or a thermal sensor.

As illustrated in (b) of FIG. 2, the temperature sensor 200 is configured to sense the temperature of an object 1000 located within a sensing area 250 of the temperature sensor 200. Here, anything is possible for the object, and for an example, the object may be a user's body.

The sensing area 250 of the temperature sensor 200 may be specified by the specifications of the temperature sensor 200. For another example, it may also be possible that the sensing area 250 of the temperature sensor 200 is set by the control of the controller 180. In other words, under the control of the controller 180, at least part of sensible area of the temperature sensor 200 may be specified as a sensing area 250.

The temperature sensor 200 may be formed of various types of thermals sensors, and denotes a sensor that senses heat to output an electrical signal. For an example, in the present disclosure, the temperature sensor 200 may be configured with a sensor that senses only the temperature of an object, and may be configured with a thermal image sensor (or a camera). When the temperature sensor 200 of the present disclosure is a thermal image sensor, it may be possible to perceive the shape of an object as well as illustrated in (c) of FIG. 2. For an example, the temperature sensor 200 of the present disclosure may be implemented with an infrared (IR) thermal sensor.

Here, the sensing area 250 of the temperature sensor 200 may be referred to as a field of view (FOV).

In the present disclosure, when the temperature of an object located in the sensing area 250 satisfies a preset temperature condition, the control of the terminal may be carried out using the characteristics of the temperature sensor 200.

Here, the preset temperature condition may be determined under the control of the controller 180 or the user, and for an example, the preset temperature condition may be whether or not a temperature sensed through the temperature sensor 200 satisfies a typical human body temperature range.

In the present disclosure, when an object located in the vicinity of the sensing area 250 of the temperature sensor 200 has a temperature corresponding to a user's body, it may be possible to estimate that the user approaches the vicinity of the terminal for the use of the terminal. Furthermore, based on this estimation, the control of the terminal may be carried out.

The temperature sensor 200 of the present disclosure may be operated in either one of an active state and an inactive state. Here, the active state may also be referred to as an "active mode" and the inactive state may be referred to as an "inactive mode" or "sleep mode".

The active state denotes a state in which the temperature sensor 200 can sense the temperature of an object located in the sensing area 250 of the temperature sensor 200.

In addition, the inactive state is a state opposite to the active state, and denotes that the temperature sensor 200 is unable to sense the temperature of an object located in the sensing area 250. When the temperature sensor 200 is in an inactive state, an operating current may not be supplied to the temperature sensor 200.

The active state and the inactive state of the temperature sensor 200 may be controlled by the controller 180.

In the present disclosure, the controller 180 controls the temperature sensor 200 to sense the temperature of an object through the temperature sensor 200 in a situation where the temperature of the object is to be sensed.

The operating status of the terminal may be largely divided into i) a locked state and ii) an unlocked state. The controller 180 may continuously, periodically or selectively operate the temperature sensor 200 in an active state in at least one of the locked state and the unlocked state, depending on the situation.

Here, the locked state is a state set for security or input error prevention, and denotes a state requiring additional input for unlocking. The terminal may switch the locked state to the unlocked state only when preset information is entered or sensed, or only when a prespecified type of touch or the liker is input.

In particular, in the present disclosure, the temperature sensor 200 may be operated in a locked state to sense the temperature of an object located in the vicinity of the terminal body in a locked state, and perform control associated with the locked state using the sensed temperature.

On the other hand, in the locked state, the touch screen may have any one of i) an active state (the illumination of the touch screen is turned on), ii) an inactive state (the illumination of the touch screen is turned off), iii) an AOD (Always on Display) state (only part of the touch screen is activated, and information is displayed in only a part thereof).

In the present disclosure, the controller 180 may operate the temperature sensor 200 in an active state regardless of the state of the touch screen in a locked state. Accordingly, the temperature sensor 200 may be operated in an active state even when the touch screen is turned off or partially turned on to sense the temperature of an object located in the vicinity of the main body.

More specifically, as illustrated in FIGS. 2A and 2B, in the present disclosure, the temperature of an object 1000 located in the sensing area 250 of the temperature sensor 200 is sensed in a locked state.

Furthermore, when the sensed temperature satisfies a preset temperature condition, the controller 180 may carry out a process of releasing the locked state.

For example, when the temperature of the object corresponds to a preset temperature range, the controller 180 may switch a locked state to an unlocked state. Here, the preset temperature range may be a user's typical body temperature.

For another example, the mobile terminal according to the present disclosure may further include an image sensor 300, and the controller 180 may acquire an image of an object using the image sensor 300 when the temperature of the object sensed through the temperature sensor satisfies a preset temperature condition. Furthermore, when the acquired image is an image satisfying a condition for switching the locked state to an unlocked state, the controller 180 may switch the locked state to the unlocked state.

Meanwhile, in the present specification, for convenience of naming, it may be possible to designate the temperature sensor 200 as a first sensor, the image sensor 300 as a second sensor, and the ordinal numbers may be exchanged with each other.

The image sensor 300 may be implemented with various types of sensors, for example, an infrared (IR) camera. In this case, as illustrated in FIG. 3, the image sensor 300 may include a transmitting unit 310 and a receiving unit 320.

More specifically, the image sensor 300 may include an infrared light emitting unit 310 that emits light including an infrared region wavelength and a infrared receiving unit 320.

The infrared receiving unit 320 may also be referred to as a "depth sensing unit," and configured to receive light emitted from the infrared light emitting unit 310 and reflected from an object located in a sensing area of the image sensor 300 to acquire an image corresponding to the object based on the arrival time of the received light. In this case, since the image sensor 300 acquires the image of an object based on the arrival time of light reflected from the object, it may be possible to acquire even the depth information of the object.

The mobile terminal according to the present disclosure may be configured to switch a locked state to an unlocked state using the temperature sensor 200 and the image sensor 300.

As illustrated in FIG. 2, the temperature sensor 200 is disposed in the main body 100, and configured to sense the temperature of an object located in the vicinity of the main body 100. Furthermore, the image sensor 300 is arranged in proximity to the temperature sensor 200 to acquire an image of the object located in the sensing area 250 of the temperature sensor 200.

At this time, the temperature sensor 200 and the image sensor 300 may be arranged in proximity to each other, and thus as illustrated in FIG. 3, at least part of a sensing area (a)

of the temperature sensor 200 and a sensing area (b, c) of the image sensor 300 may form an area (b', c') overlapping with each other.

The image sensor 300 may acquire an image of at least part of an image of an object located in the sensing area (b', c') in which the sensing areas (b, c) of the image sensor 300 overlaps with the sensing area (a) of the temperature sensor 200 among objects located in the sensing area (a) of the temperature sensor 200. As a result, an image of an object may be acquired by the image sensor 300 while sensing the temperature of the object through the temperature sensor 200.

In the present disclosure, when an object satisfying a preset temperature condition is sensed by the temperature sensor 200, thereafter, the process of acquiring an image of the object using the image sensor 300 will be mainly described. However, for another example, it may also be possible to acquire an image of an object through the image sensor 300 while at the same time the temperature of the object is sensed by the temperature sensor 200. Moreover, when the image sensor 300 is activated, it may also be possible to begin with acquiring the image of the object through the image sensor 300.

Meanwhile, in the mobile terminal according to the present disclosure, as described above, the operating state of the temperature sensor 200 may be controlled in an active state even when the touch screen is inactivated thereby sensing the temperature of the object in a locked state.

At this time, the temperature sensor 200 may be continuously operated in an active state in the locked state. On the other hand, the image sensor 300 may be operated in either one of an active state and an inactive state in the locked state.

More specifically, the image sensor 300 may vary depending on whether the temperature of the object sensed through the temperature sensor 200 in the locked state satisfies the preset temperature condition.

The controller 180 may initially operate the temperature sensor 200 in an active state and the image sensor 300 in an inactive state in the locked state.

Furthermore, the temperature sensor 200 is configured to sense the temperature of the object when the object is located within the sensing area of the temperature sensor 200.

The controller 180 senses the temperature of the object located in the vicinity of the main body 100 through the temperature sensor 200, and when the temperature of the object satisfies a preset temperature condition as a result of the sensing, the controller 180 may activate the image sensor 300. Then, the controller 180 may acquire the image of the object using the activated image sensor 300.

The operating status of the image sensor 300 in the locked state may be operated in either one of the active state and the inactive state while the temperature sensor 200 is operated in the active state.

While the image sensor 300 is operated in the inactive state in the locked state, the temperature sensor 200 may be operated in the active state, and when an object satisfying a preset temperature condition is sensed by the temperature sensor 200, the operating status may be changed from the inactive state to the active state.

In other words, the image sensor 300 may be activated to acquire the image of an object only when the object satisfying a preset temperature condition is sensed.

When an object satisfying a preset temperature condition is sensed by the temperature sensor 200, the controller 180 may generate an event (or a trigger signal) for activating the image sensor 300. Then, based on such an event, the image sensor 300 that has been operated in an inactive state in the locked state may be operated in an active state.

Furthermore, when an image acquired through the image sensor 300 corresponds to pre-registered user authentication information, the controller 180 may switch the locked state of the terminal to the unlocked state.

Here, the pre-registered user authentication information may be an image corresponding to a user's body part. For example, the pre-registered user authentication information may be an image corresponding to any one of various body parts such as a user's face image, a palm image, a hand image, and the like.

Furthermore, the pre-registered user authentication information may be a user's vein information.

In this case, the image sensor 300 may be configured to acquire the user's vein image.

For another example, when pre-registered user authentication information corresponds to a user's face image, the process of acquiring the image of an object through the image sensor 300 may be a part of the face recognition process.

As described above, the temperature sensor 200 senses the temperature of an object located in the vicinity of the main body 100 while the second sensor is operated in the inactive state in the locked state. Furthermore, when the temperature of the object satisfies a preset temperature condition as a result of sensing through the temperature sensor 200, the image sensor 300 may be switched from an inactive state to an active state to acquire an image of the object in the locked state.

Furthermore, the controller 180 may perform a user authentication process using the acquired image to release the locked state.

As described above, according to the present disclosure, when an object satisfying a preset temperature condition is recognized using a temperature sensor, an sensor other than the temperature sensor (for example, an image sensor) may be activated to sense additional information. Furthermore, the status of the terminal may be controlled (for example, locked state control) based on additional information. As described above, in the present disclosure, the image sensor may be activated based on information sensed by the temperature sensor to perform the control of the terminal, and for this purpose, the temperature sensor and the image sensor may be arranged in proximity to each other to overlap a sensing area of the temperature sensor with a sensing area of the image sensor.

On the other hand, the mobile terminal according to the present disclosure may be provided with at least one sensor capable of sensing a user's biometric information, and may include a sensor capable of sensing the user's vein from the user's biometric information. The above-described image sensor may be provided with a function of a vein authentication sensor. Furthermore, it may be possible to control the function of the terminal using such user biometric information.

On the other hand, examples of arranging the temperature sensor and the image sensor in proximity to each other may vary widely, and specific examples will be described in more detail below with reference to the accompanying drawings.

Figure 4A:
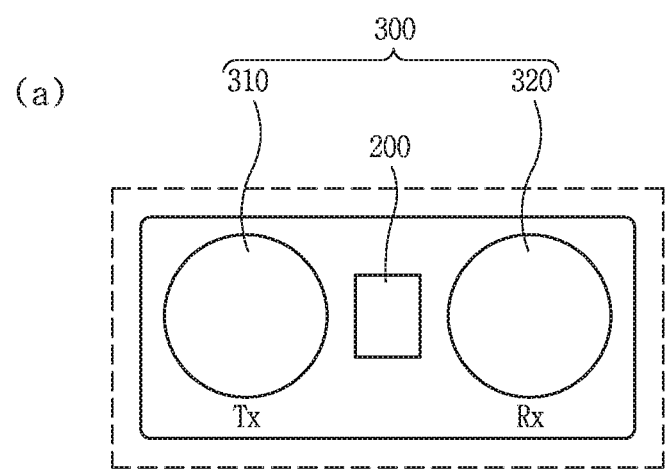
FIGS. 4A, 4B, and 4C are conceptual views for explaining a temperature sensor according to the present disclosure.
Figure 4A:
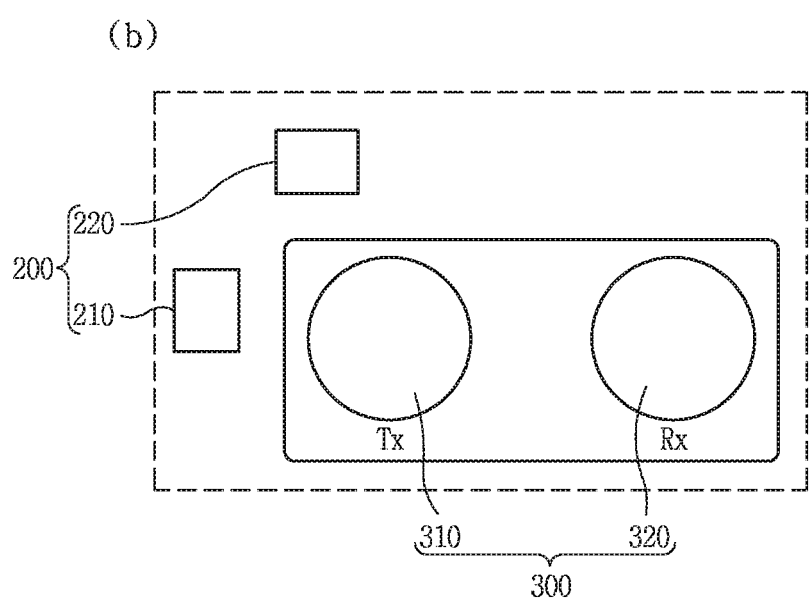
Figure 4B:
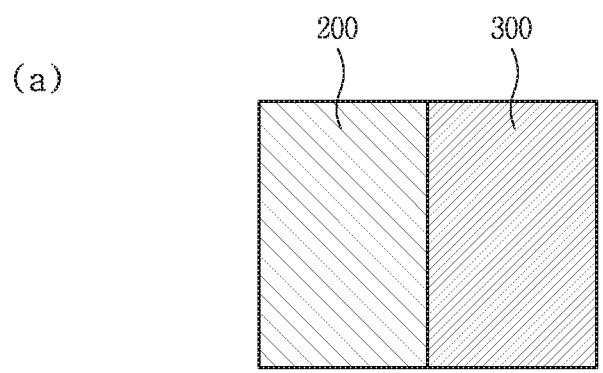
Figure 4B:
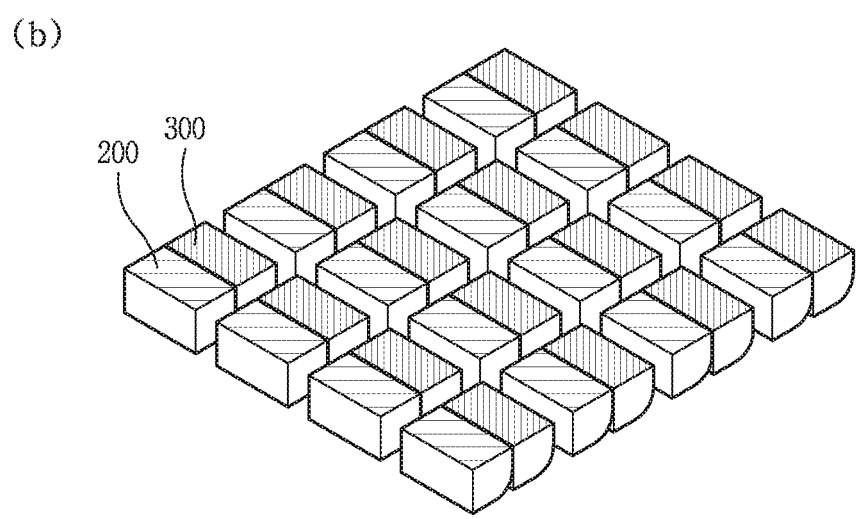
Figure 4C:
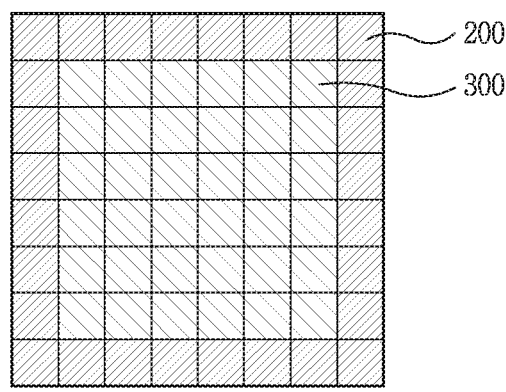
Figure 4C:
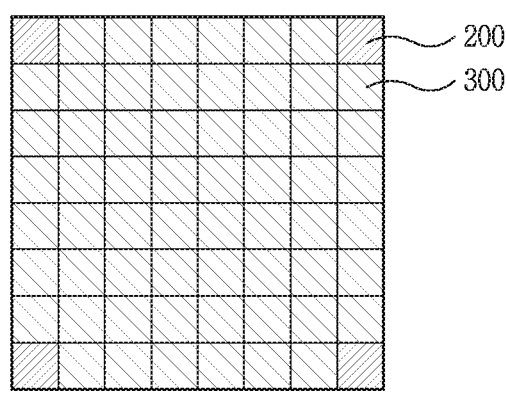
Figure 4C:
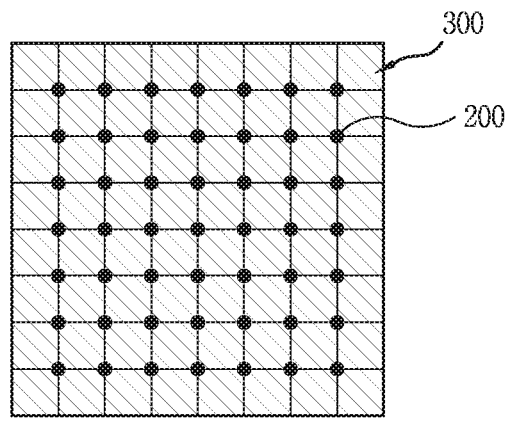

FIGS. 4A, 4B, and 4C are conceptual views for explaining a temperature sensor according to the present disclosure.

For an example, as described above, the image sensor 300 may be configured with an infrared (IR) camera. In this case, as illustrated in FIG. 3, the image sensor 300 may include the transmitting unit 310 and the receiving unit 320. More specifically, the image sensor 300 may include an infrared light emitting unit 310 that emits light including an infrared region wavelength and a infrared receiving unit 320.

Here, as illustrated in (a) of FIG. 4A, the temperature sensor 200 according to the present disclosure may be disposed between the transmitting unit 310 (or infrared light emitting unit) and the receiving unit 320 (or infrared receiving unit) of the image sensor 300. Though the temperature sensor 200 is illustrated as a single unit in (a) of FIG. 4A, a plurality of temperature sensors 200 may be disposed between the transmitting unit 310 (or infrared light emitting unit) and the receiving unit 320 (or infrared receiving unit).

For still another example, the temperature sensor 200 may be disposed in the vicinity of at least one of the transmitting unit 310 (or infrared light emitting unit) and the receiving unit 320 (or infrared receiving unit) of the image sensor 300, as illustrated in (b) of FIG. 4A. For example, as shown in the drawing, along the circumference of the transmitting unit 310, the temperature sensors 210, 220 may be arranged. Further, although not shown, the temperature sensor 200 may be disposed along the circumference of the receiving unit 320. In this case, the temperature sensor 200 may be disposed around the image sensor 300 to surround the vicinity of the image sensor 300.

For another example, the temperature sensor 200 may be a thermal image sensor (or a camera). When the temperature sensor 200 of the present disclosure is a thermal image sensor, it is possible to perceive even the shape of the object as well. For an example, the temperature sensor 200 of the present disclosure may be implemented with an infrared (IR) thermal sensor. Furthermore, the image sensor 300 may also be configured with an IR camera. In this case, as shown in (a) of FIG. 4B, the temperature sensor 200 and the image sensor 300 may share one pixel. In other words, one pixel may be divided into a plurality of regions, one of the plurality of regions may be operated by the temperature sensor 200, and another region thereof may be operated by the image sensor 300. In other words, according to the present disclosure, temperature and image may be sensed using two bands of infrared rays in one pixel (or chip).

In the present disclosure, a temperature sensing layer (or a filter) may be disposed in a region provided with the temperature sensor 200 in one pixel to perform temperature sensing. At this time, which information between the temperature and the image is to be sensed may be controlled by software implementation.

In the present specification, a pixel that senses temperature is referred to as a "temperature sensor pixel," and a pixel that senses an image may be referred to as an "image sensor pixel."

On the other hand, the controller 180 may control a plurality of pixels such that part of the plurality of pixels senses temperature and another part thereof senses an image.

At this time, the controller 180 may control which one of the plurality of pixels senses temperature and which one of the plurality of pixels senses an image.

The controller 180 may determine the number and location of pixels to be activated among a plurality of temperature sensor pixels according to the type of information to be acquired through the temperature sensor 200 in the locked state.

Furthermore, during temperature sensing, the number of pixels used for temperature sensors may be increased depending on the subject of information to be sensed. For example, when sensing even the temperature distribution shape of an object rather than the number of pixels used upon sensing only the temperature of the object, the number of pixels used may be increased. In other words, the number of temperature sensor pixels activated to acquire the shape information and temperature information of the object may be larger than the number of temperature sensor pixels activated to acquire temperature information of the object.

In this case, the controller 180 may control the sensor such that the number of pixels used as the temperature sensor is larger.

On the other hand, as described above, the temperature sensor may be implemented with a plurality of pixels, even when one pixel is not shared with the image sensor. In this case, which of the plurality of pixels to activate or the position of the activated pixel may be controlled based on the information of the object to be sensed (for example, the temperature information of the object, the temperature distribution information of the object).

Even in this case, as described above, the number of pixels used as the temperature sensor may be increased depending on the subject of the information to be sensed during temperature sensing. For example, when sensing even the temperature distribution shape of an object rather than the number of pixels used upon sensing only the temperature of the object, the number of pixels used may be increased. In other words, the number of temperature sensor pixels activated to acquire the shape information and temperature information of the object may be larger than the number of temperature sensor pixels activated to acquire temperature information of the object.

In such a manner, the temperature sensor 200 may include a plurality of temperature sensor pixels, and the controller may sense at least one of a temperature and a temperature distribution of an object to be sensed using at least part of the plurality of temperature sensor pixels.

As described above, the temperature sensor 200 may sense the temperature of the object in a locked state, and at least one of the plurality of temperature sensor pixels may continuously maintain an active state to sense the temperature of the object.

Furthermore, a sensor pixel provided with both the temperature sensor and the image sensor in such a single pixel may form a sensor array composed of a plurality of pixels, as illustrated in (b) of FIG. 4B. Such a sensor array composed of a plurality of pixels may increase the sensitivity and accuracy of sensing.

For still another example, the temperature sensor may be configured to replace at least some pixels of an image sensor constituting a plurality of pixels.

For example, as illustrated in (a) of FIG. 4C, the temperature sensor 200 may be disposed on the circumference of a sensor array composed of the image sensor pixels 300. Here, the temperature sensor 200 may also be composed of a plurality of pixels. The controller 180 may activate at least one of the plurality of pixels according to information to be sensed.

For another example, the temperature sensor may be located only at each apex of the image sensor pixels 300, as illustrated in (b) of FIG. 4C.

In this case, a resolution in which the arranged temperature sensor pixels are activated to sense an object as illustrated in (b) of FIG. 4C may be lower than that in which all the arranged temperature sensor pixels are activated to sense the object as illustrated in (a) of FIG. 4C.

For still another example, as illustrated in (c) of FIG. 4C, the temperature sensor (or temperature sensor pixel, 200) may be disposed between the image sensors (or image sensor pixels, 300).

According to the present disclosure, the temperature sensor may include a plurality of temperature sensor pixels, and the image sensor may include a plurality of image sensor pixels.

Furthermore, each of the plurality of temperature sensor pixels may be disposed between the plurality of image sensor pixels.

As illustrated in the drawing, the temperature sensor pixel may be disposed between the image sensors in a grid shape.

In addition, although not shown, a temperature sensor layer may be arranged on the image sensor, thereby using at least part of the image sensor as a temperature sensor. In this case, a degree of matching between the sensing areas (or fields of view (FOVs) or regions of interest (ROIs) of the image sensor and the temperature sensor may be very high.

As described above, according to a mobile terminal in accordance with the present disclosure and a control method thereof, the temperature sensor and the image sensor may be arranged in various ways, and a process according to the present disclosure is not restricted to any one of the arrangement structures as described above.

Figure 5A:
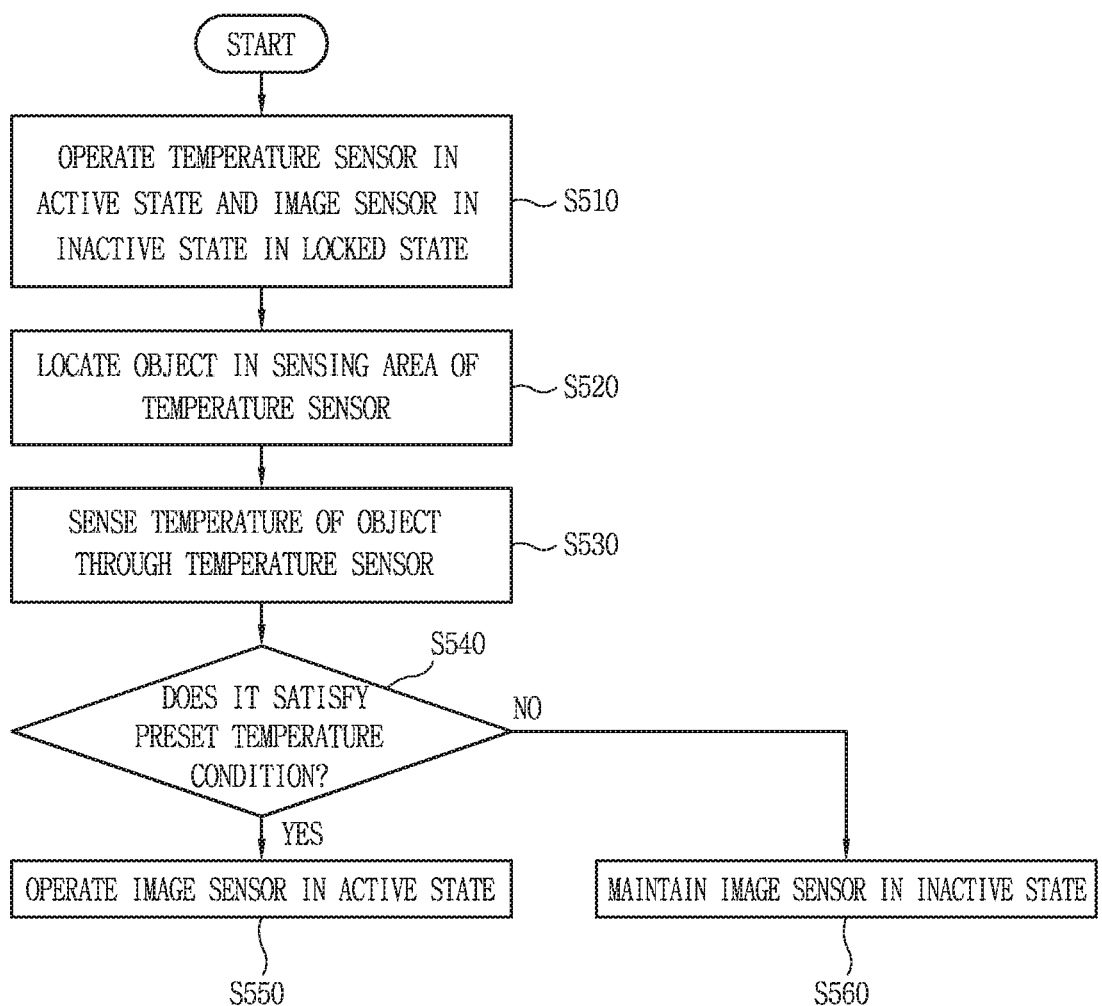
FIGS. 5A and 5B are flowcharts for explaining a method of controlling a locked state using a temperature sensor according to the present disclosure.
Figure 5B:
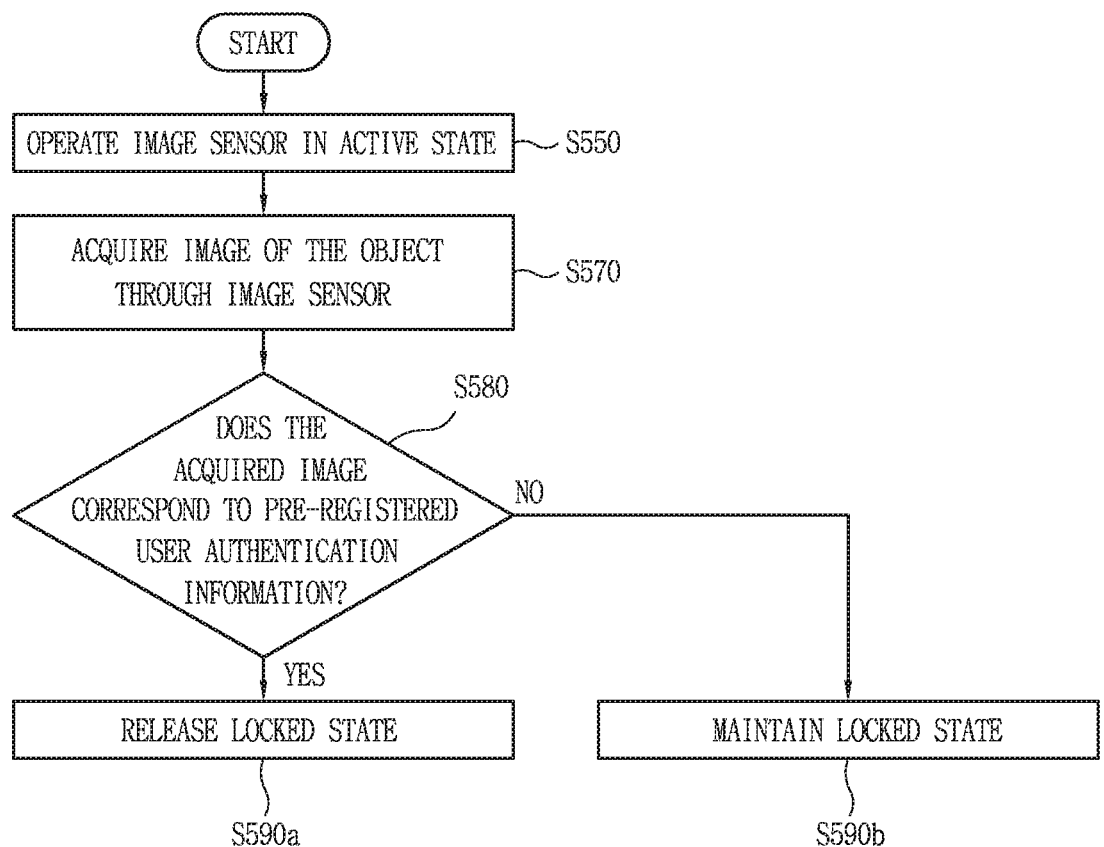
Figure 6:
FIG. 6 is a conceptual view for explaining a method of controlling a locked state using a temperature sensor according to the present disclosure.
Figure 6:
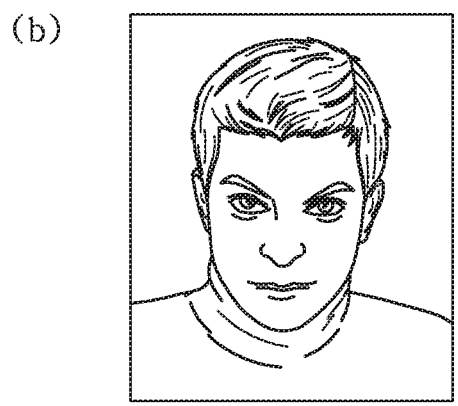
Figure 6:
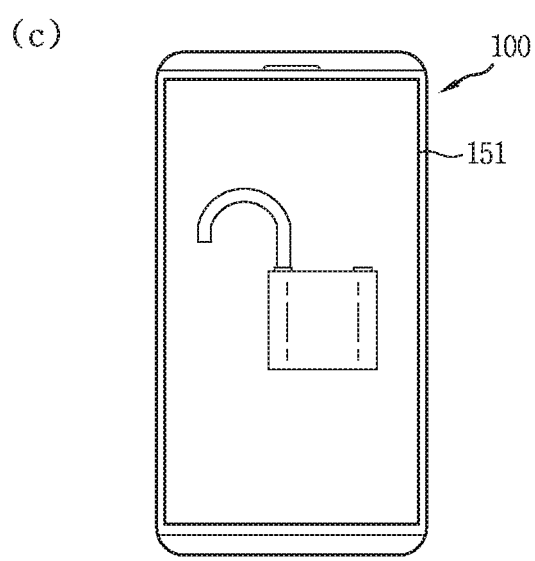

Hereinafter, a method of controlling the locked state of a terminal using the temperature sensor and the image sensor will be described in more detail with reference to the accompanying drawings. FIGS. 5A and 5B are flowcharts for explaining a method of controlling a locked state using a temperature sensor according to the present disclosure. Furthermore, FIG. 6 is a conceptual view for explaining a method of controlling a locked state using a temperature sensor according to the present disclosure.

In a mobile terminal according to the present disclosure, a process for releasing a locked state using information sensed by a temperature sensor operated to an activated state in the locked state.

As described above, in the present disclosure, the temperature sensor 200 may be operated in a locked state to sense the temperature of an object located in the vicinity of the terminal body in a locked state, and perform control associated with the locked state using the sensed temperature.

In the present disclosure, the controller 180 may operate the temperature sensor 200 in an active state regardless of the state of the touch screen in a locked state. Accordingly, the temperature sensor 200 may be operated in an active state even when the touch screen is turned off or partially turned on to sense the temperature of an object located in the vicinity of the main body.

First, in the present disclosure, the process of operating the temperature sensor 200 in an unlocked state and the image sensor 300 in an inactive state is performed is carried out (S510).

In the locked state, the touch screen may have any one of i) an active state (the illumination of the touch screen is turned on), ii) an inactive state (the illumination of the touch screen is turned off), iii) an AOD (Always on Display) state (only part of the touch screen is activated, and information is displayed in only a part thereof).

In the present disclosure, the controller 180 may operate the temperature sensor 200 in an active state regardless of the state of the touch screen in a locked state. Accordingly, the temperature sensor 200 may be operated in an active state even when the touch screen is turned off or partially turned on to sense the temperature of an object located in the vicinity of the main body.

In the locked state, the temperature sensor 200 is continuously operated in an activated state, thereby sensing the temperature of an object located in the vicinity of the temperature sensor 200. When an object is located in the sensing area of the temperature sensor 200 while operating the temperature sensor 200 in an active state (S520), the temperature sensor 200 performs the process of sensing the temperature of the object located in the sensing area (S530).

Here, the sensing area of the temperature sensor 200 may also be referred to a field of View (FOV) or region of interest (ROI).

When the temperature of the object is sensed by the temperature sensor 200, the process of determining whether the sensed temperature of the object satisfies a preset temperature condition is carried out (S540).

The controller 180 determines whether temperature sensed by the temperature sensor 200 satisfies a preset temperature condition. Here, the preset temperature condition may be determined under the control of the controller 180 or the user, and for an example, the preset temperature condition may be whether or not a temperature sensed through the temperature sensor 200 satisfies a typical human body temperature range.

For example, the preset temperature condition may be "whether the sensed temperature of the object is in a range of 30° C. to 36° C.

In other words, in the present disclosure, when an object located in the vicinity of the sensing area 250 of the temperature sensor 200 has a temperature corresponding to a user's body, it may be possible to estimate that the user approaches the vicinity of the terminal for the use of the terminal. Furthermore, based on this estimation, the control of the terminal may be carried out.

In other words, in the present disclosure, even when the user does not apply any artificial manipulation such as applying a touch to the terminal, pressing the button, or moving the terminal, the controller may determine that the user wants to proceed with the process for controlling the locked state only with an operation of taking his or her hand, face or the like to the vicinity of the terminal.

On the other hand, when the temperature of the object satisfies a preset temperature condition as a result of the determination in step S540, the process of operating the image sensor in an active state is carried out (S550).

Furthermore, on the contrary, when the temperature of the object does not satisfy the preset temperature condition as a result of the determination in step S540, the process of operating the image sensor in an inactive state is carried out (S560).

In other words, in this case, the image sensor 300 may continuously maintain the inactive state. As described above, the operating status of the image sensor 300 in the locked state may be operated in either one of the active state and the inactive state while the temperature sensor 200 is operated in the active state.

While the image sensor 300 is operated in the inactive state in the locked state, the temperature sensor 200 may be operated in the active state, and when an object satisfying a preset temperature condition is sensed by the temperature sensor 200, the operating status may be changed from the inactive state to the active state.

In other words, the image sensor 300 may be activated to acquire the image of an object only when the object satisfying a preset temperature condition is sensed.

Accordingly, when an object satisfying a preset temperature condition is not sensed as a result of the determination in step S540, the image sensor 300 may continuously maintain an inactive state.

On the other hand, when an object satisfying the preset temperature condition is sensed as a result of the determination in step S540, the process of operating the image sensor 300 in an active state is carried out (S550). In other words, the operating status of the image sensor 300 being operated in an inactive state in the locked state may be changed to an activated state.

Furthermore, as illustrated in FIG. 5B, the process of acquiring an image of an object by the image sensor 300 is carried out (S570).

When an object satisfying a preset temperature condition is sensed by the temperature sensor 200, the controller 180 may generate an event (or a trigger signal) for activating the image sensor 300. Then, based on such an event, the image sensor 300 that has been operated in an inactive state in the locked state may be operated in an active state.

As illustrated above in FIG. 3, the temperature sensor and the image sensor may be arranged in proximity to each other such that a sensing area of the temperature sensor and a sensing area of the image sensor overlap with each other.

In other words, the temperature sensor 200 and the image sensor 300 may be arranged in proximity to each other, and thus as illustrated in FIG. 3, at least part of a sensing area (a) of the temperature sensor 200 and a sensing area (b, c) of the image sensor 300 may form an area (b', c') overlapping with each other.

The image sensor 300 may acquire an image of at least part of an image of an object located in the sensing area (b', c') in which the sensing areas (b, c) of the image sensor 300 overlaps with the sensing area (a) of the temperature sensor 200 among objects located in the sensing area (a) of the temperature sensor 200. As a result, an image of an object may be acquired by the image sensor 300 while sensing the temperature of the object through the temperature sensor 200.

Meanwhile, when the image of the object is acquired through the temperature sensor, the process of determining whether the acquired image corresponds to pre-registered user authentication information is carried out (S580).

When an image acquired through the image sensor 300 corresponds to pre-registered user authentication information, the controller 180 may switch the locked state of the terminal to the unlocked state.

Here, the pre-registered user authentication information may be an image corresponding to a user's body part. For example, the pre-registered user authentication information may be an image corresponding to any one of various body parts such as a user's face image, a palm image, a hand image, and the like. In other words, the controller 180 may perform a user authentication process using the acquired image to release the locked state.

Furthermore, the pre-registered user authentication information may be a user's vein information.

In this case, the image sensor 300 may be configured to acquire the user's vein image.

For another example, when pre-registered user authentication information corresponds to a user's face image, the process of acquiring the image of an object through the image sensor 300 may be a part of the face recognition process.

For example, any one of a variety of authentication processes such as a face recognition process, a vein recognition process, and a gesture recognition process may be applied to a user authentication process. The user authentication process may be carried out using at least one of information that can be acquired through the image sensor, and there is no limitation on the type.

In other words, when an image acquired through the image sensor 300 corresponds to pre-registered user authentication information as a result of the determination, the process of switching a locked state to an unlocked state is carried out (S590a). When an image acquired through the image sensor 300 corresponds to pre-registered user authentication information, the controller 180 may switch the locked state of the terminal to the unlocked state.

For example, when a locked state is switched to an unlocked state through a face authentication process, a user's face may be an object, as illustrated in (a) of FIG. 6. When the user's face is located in the sensing area, the temperature sensor 200 senses the temperature of the user's face. The controller 180 activates the image sensor 300 when the sensed temperature satisfies a preset temperature condition. Furthermore, when an image of the user's face is acquired through the image sensor 300 and the acquired image corresponds to pre-registered user authentication information as illustrated in (b) of FIG. 6, a locked state is switched to an unlocked state as illustrated in (c) of FIG. 6.

Meanwhile, during the above process, the touch screen may continuously maintain an inactive state. In other words, the controller 180 may perform the temperature sensing and image sensing of the object while the touch screen is in an inactive state. In this case, when the locked state is switched to the unlocked state, the controller 180 may switch the touch screen to an active state to display information.

The controller 180 may display preset information to be displayed in the unlocked state. The information may be a home screen page, a specific mode screen, or an execution screen of a preset application.

Here, the home screen page refers to a screen on which an icon of an application installed in the mobile terminal is output, and means a screen that is output as default when the locked state of the terminal is changed to the unlocked state.

Furthermore, the temperature sensing and image sensing may be carried out even while the touch screen is in an active state. In other words, when the temperature of the object is sensed in the locked state in which the touch screen is activated, the controller 180 may perform image sensing while maintaining the active state of the touch screen.

Furthermore, when the temperature of the object is sensed while the touch screen is in an inactive state and the sensed temperature of the object satisfies a preset temperature condition, the controller 180 may switch the inactive state to an active state of the touch screen to acquire an image of the object.

On the other hand, when an image acquired through the image sensor 300 does not correspond to pre-registered user authentication information as a result of the determination in step S580, the process of maintaining the locked state is carried out (S590b).

When the image acquired through the image sensor 300 does not correspond to pre-registered user authentication information, the controller 180 may control the image sensor 300 to acquire the image of the object again. As the user authentication fails, the process of acquiring the image of the object again may be repeated a preset number of times.

Furthermore, when the image acquired through the image sensor 300 does not correspond to pre-registered user authentication information, the controller 180 may perform another authentication method other than the image acquisition method. For example, the controller 180 may perform at least one of a voice recognition process, a fingerprint recognition process, a pattern input process, and a password input process. The controller 180 may display notification information indicating that another authentication method is carried out on the touch screen.

On the other hand, when the acquired image of the object is not an image of the pre-registered user, the controller 180 may display notification information indicating that the image authentication process has failed on the touch screen.

As described above, according to a mobile terminal in accordance with the present disclosure and a control method thereof, a user may release the locked state of the terminal and enter a home screen page only by locating his or her body part on the terminal body without direct contact with the terminal.

Furthermore, according to a mobile terminal in accordance with the present disclosure and a control method thereof, an unlocking step may be divided into a plurality of steps (a temperature sensing step and an image acquisition step) to accurately know a user's intention to use the terminal. Accordingly, when a user approaches the terminal with no intention to use the terminal, it may be possible to prevent the terminal from being unlocked unnecessarily.

In the above example, a method of activating an image sensor when the temperature of an object is sensed using a temperature sensor, and the sensed temperature satisfies a preset temperature condition has been described. In the present disclosure, as described above, the temperature sensor may be implemented with an IR camera. In other words, the temperature sensor may be a thermal image sensor (or camera). When the temperature sensor of the present disclosure is a thermal image sensor, it is possible to perceive even the shape of the object as well. For an example, the temperature sensor 200 of the present disclosure may be implemented with an infrared (IR) thermal sensor.

Figure 7A:
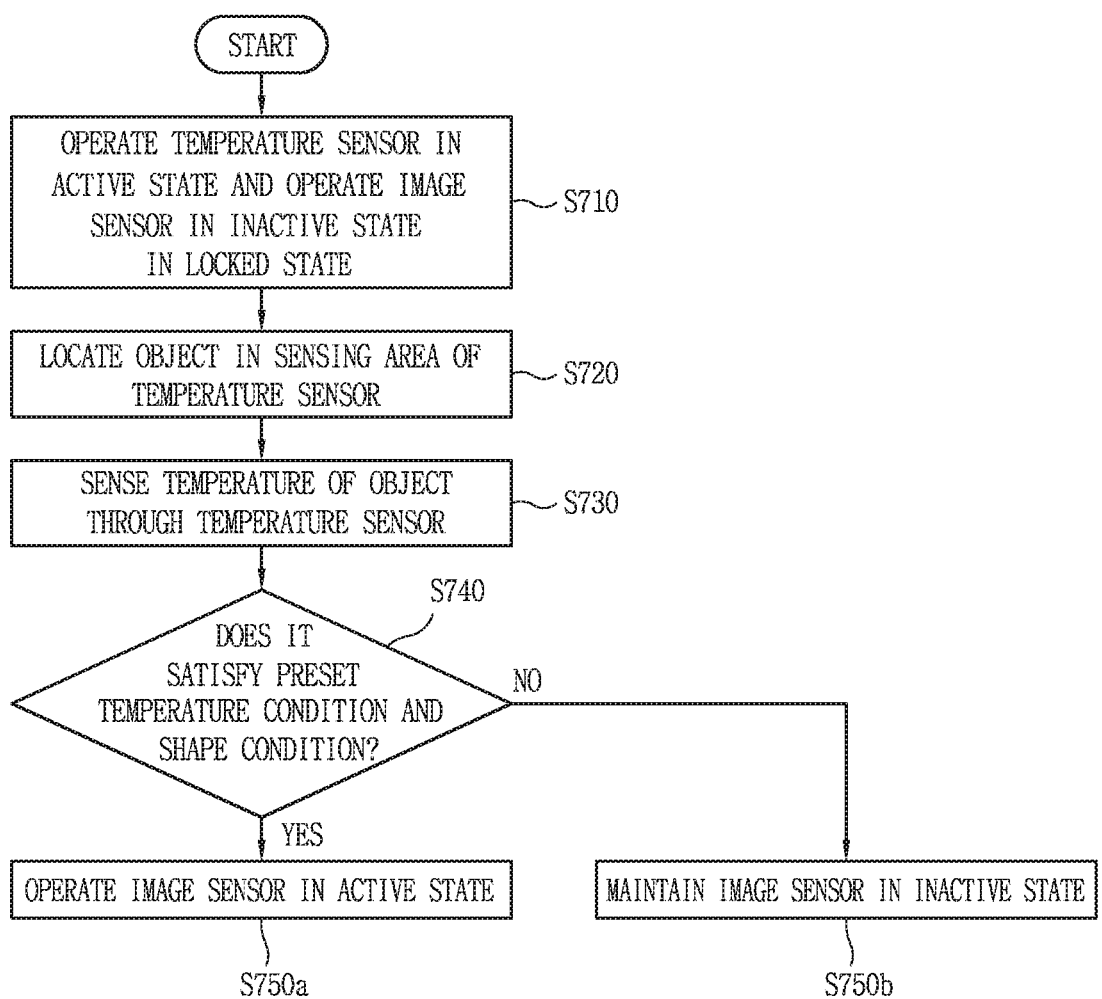
FIGS. 7A and 7B are conceptual views for explaining another example of controlling a locked state using a temperature sensor according to the present disclosure.
Figure 7B:
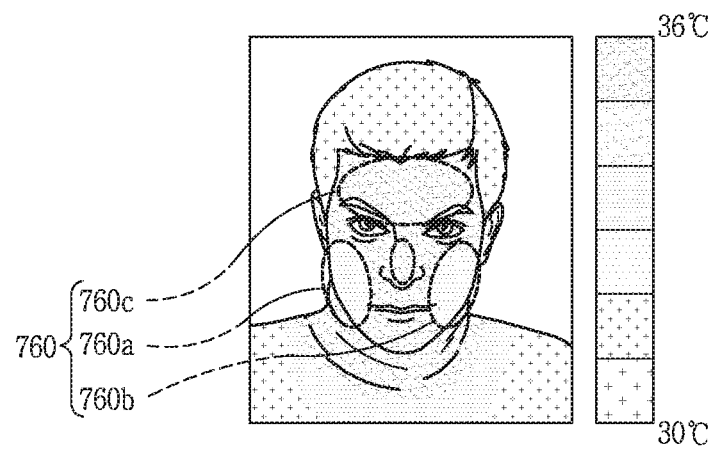

Here, according to the present disclosure, both the temperature and shape of an object located in the sensing area (or field of view (FOV) or region of interest (ROI)) of the temperature sensor may be perceived to perform a process for releasing the locked state. Hereinafter, a method of releasing the locked state in consideration of the shape of the object as well will be described in more detail with reference to the accompanying drawings. FIGS. 7A and 7B are conceptual views for explaining another example of controlling a locked state using a temperature sensor according to the present disclosure.

First, in the present disclosure, the process of operating the temperature sensor 200 in an unlocked state and the image sensor 300 in an inactive state is performed is carried out (S710).

In the locked state, the touch screen may have any one of i) an active state (the illumination of the touch screen is turned on), ii) an inactive state (the illumination of the touch screen is turned off), iii) an AOD (Always on Display) state (only part of the touch screen is activated, and information is displayed in only a part thereof).

In the present disclosure, the controller 180 may operate the temperature sensor 200 in an active state regardless of the state of the touch screen in a locked state. Accordingly, the temperature sensor 200 may be operated in an active state even when the touch screen is turned off or partially turned on to sense the temperature of an object located in the vicinity of the main body.

In the locked state, the temperature sensor 200 is continuously operated in an activated state, thereby sensing the temperature of an object located in the vicinity of the temperature sensor 200. When an object is located in the sensing area of the temperature sensor 200 while operating the temperature sensor 200 in an active state (S720), the temperature sensor 200 performs the process of sensing the temperature of the object located in the sensing area (S730).

Here, the sensing area of the temperature sensor 200 may be referred to as a field of view (FOV).

When the temperature of the object is sensed by the temperature sensor 200, the process of determining whether the sensed temperature of the object satisfies a preset temperature and shape condition is carried out (S740).

First, the controller 180 determines whether temperature sensed by the temperature sensor 200 satisfies a preset temperature condition. Here, the preset temperature condition may be determined under the control of the controller 180 or the user, and for an example, the preset temperature condition may be whether or not a temperature sensed through the temperature sensor 200 satisfies a typical human body temperature range.

For example, the preset temperature condition may be "whether the sensed temperature of the object is in a range of 30° C. to 36° C.

In other words, in the present disclosure, when an object located in the vicinity of the sensing area 250 of the temperature sensor 200 has a temperature corresponding to a user's body, it may be possible to estimate that the user approaches the vicinity of the terminal for the use of the terminal. Furthermore, based on this estimation, the control of the terminal may be carried out.

In other words, in the present disclosure, even when the user does not apply any artificial manipulation such as applying a touch to the terminal, pressing the button, or moving the terminal, the controller may determine that the user wants to proceed with the process for controlling the locked state only with an operation of taking his or her hand, face or the like to the vicinity of the terminal.

In addition, the controller 180 perceives the shape of the object based on information sensed by the temperature sensor 200.

When the object satisfying the preset temperature condition is sensed through the temperature sensor 200, the controller 180 may acquire the shape of the object corresponding to an area in which the temperature of the object is sensed, and perform different controls depending on the shape of the object. For example, the controller 180 may activate the image sensor when the shape of the object satisfies a preset shape condition, and maintain an inactive state of the image sensor when does not satisfy the condition.

Here, the shape of the object satisfying the preset condition may correspond to the shape of a preset object to be authenticated so as to perform authentication in order to switch the locked state to the unlocked state.

For example, when face authentication is carried out, the shape of the preset object to be authenticated may be a face shape. For another example, when vein authentication is carried out, the shape of the preset object to be authenticated may be a hand shape.

The shape of the preset object to be authenticated may be a shape associated with preset user authentication information registered to switch the locked state to the unlocked state.

For example, the preset user authentication information may be a user's face image, and at this time, the shape of the preset object to be authenticated may be a face shape.

As described above, in the present disclosure, it is determined whether the preset object satisfies a temperature and shape condition.

At this time, the order of determining which one of the temperature condition and the shape condition is satisfied first may be changed in various ways.

In other words, the image sensor may be activated only when both the conditions are satisfied, regardless of which condition is satisfied first.

On the other hand, the controller 180 may analyze whether an object satisfies a preset shape condition using the distribution area and distribution size of temperature sensed through the temperature sensor 200.

In other words, an object corresponding to the pre-registered user authentication information corresponds to a user's body part, and as illustrated in FIG. 7B, the controller 180 may determine that the sensed object satisfies a preset shape condition when the temperature distribution corresponds to a shape of an object corresponding to the pre-registered user authentication information.

For another example, a person has a unique body appearance, such as a unique facial appearance or a hand appearance. In other words, for each person, a size of nose, an area of cheek, an area of forehead, and a length of finger are different.

Accordingly, when the object is sensed through the temperature sensor 200, it has different temperature distribution regions (for example, 760a, 760b, 760c in FIG. 7B) for each person. The controller 180 may perform comparison with an object (or a user or a user's appearance information) corresponding to pre-registered user authentication information using at least one of the location and size of the temperature distribution region.

In other words, the controller 180 may analyze user appearance information based on pre-stored user authentication information, and compare the appearance information with temperature distribution information sensed by the temperature sensor 200.

Furthermore, as a result of the comparison, the controller 180 may determine that a genuine user has approached the terminal to perform unlocking when a matching rate between the user appearance information and the sensed temperature distribution information is above a preset reference value. In this case, in the present disclosure, it may be determined that the preset shape condition is satisfied.

On the other hand, when the object satisfies a preset temperature and shape condition as a result of the determination in step S740, the process of operating the image sensor in an active state is carried out (S750a).

Furthermore, on the contrary, when the temperature of the object does not satisfy the preset temperature and shape condition as a result of the determination in step S740, the process of operating the image sensor in an inactive state is carried out (S750b).

In other words, in this case, the image sensor 300 may continuously maintain the inactive state. As described above, the operating status of the image sensor 300 in the locked state may be operated in either one of the active state and the inactive state while the temperature sensor 200 is operated in the active state.

While the image sensor 300 is operated in the inactive state in the locked state, the temperature sensor 200 may be operated in the active state, and when an object satisfying a preset temperature condition is sensed by the temperature sensor 200, the operating status may be changed from the inactive state to the active state.

In other words, the image sensor 300 may be activated to acquire the image of an object only when the object satisfying a preset temperature and shape condition is sensed.

Accordingly, when an object satisfying a preset temperature and shape condition is not sensed as a result of the determination in step S740, the image sensor 300 may continuously maintain an inactive state.

On the other hand, when an object satisfying the preset temperature and shape condition is sensed as a result of the determination in step S740, the process of operating the image sensor 300 in an active state is carried out (S750a). In other words, the operating status of the image sensor 300 being operated in an inactive state in the locked state may be changed to an activated state.

Then, the process of acquiring an image of the object by the image sensor 300 is carried out. When an object satisfying a preset temperature and shape condition is sensed by the temperature sensor 200, the controller 180 may generate an event (or a trigger signal) for activating the image sensor 300. Then, based on such an event, the image sensor 300 that has been operated in an inactive state in the locked state may be operated in an active state.

As illustrated above in FIG. 3, the temperature sensor and the image sensor may be arranged in proximity to each other such that a sensing area of the temperature sensor and a sensing area of the image sensor overlap with each other.

In other words, the temperature sensor 200 and the image sensor 300 may be arranged in proximity to each other, and thus as illustrated in FIG. 3, at least part of a sensing area (a) of the temperature sensor 200 and a sensing area (b, c) of the image sensor 300 may form an area (b', c') overlapping with each other.

The image sensor 300 may acquire an image of at least part of an image of an object located in the sensing area (b', c') in which the sensing areas (b, c) of the image sensor 300 overlaps with the sensing area (a) of the temperature sensor 200 among objects located in the sensing area (a) of the temperature sensor 200. As a result, an image of an object may be acquired by the image sensor 300 while sensing the temperature of the object through the temperature sensor 200.

Meanwhile, when the image of the object is acquired through the temperature sensor, the process of determining whether the acquired image corresponds to pre-registered user authentication information is carried out.

When an image acquired through the image sensor 300 corresponds to pre-registered user authentication information, the controller 180 may switch the locked state of the terminal to the unlocked state.

Here, the pre-registered user authentication information may be an image corresponding to a user's body part. For example, the pre-registered user authentication information may be an image corresponding to any one of various body parts such as a user's face image, a palm image, a hand image, and the like. Furthermore, the pre-registered user authentication information may be a user's vein information. In this case, the image sensor 300 may be configured to acquire the user's vein image.

On the other hand, here, user authentication may be carried out on an object that has satisfied the shape condition.

In other words, when the object that has satisfied the shape condition is a user face, a face authentication process may be carried out.

Meanwhile, when an image acquired through the image sensor 300 corresponds to pre-registered user authentication information as a result of the determination, the process of switching a locked state to an unlocked state is carried out. When an image acquired through the image sensor 300 corresponds to pre-registered user authentication information, the controller 180 may switch the locked state of the terminal to the unlocked state.

Meanwhile, during the above process, the touch screen may continuously maintain an inactive state. In other words, the controller 180 may perform the temperature sensing and image sensing of the object while the touch screen is in an inactive state. In this case, when the locked state is switched to the unlocked state, the controller 180 may switch the touch screen to an active state to display information.

The controller 180 may display preset information to be displayed in the unlocked state. The information may be a home screen page, a specific mode screen, or an execution screen of a preset application.

Here, the home screen page refers to a screen on which an icon of an application installed in the mobile terminal is output, and means a screen that is output as default when the locked state of the terminal is changed to the unlocked state.

Furthermore, the temperature sensing and image sensing may be carried out even while the touch screen is in an active state. In other words, when the temperature of the object is sensed in the locked state in which the touch screen is activated, the controller 180 may perform image sensing while maintaining the active state of the touch screen.

Furthermore, when the temperature of the object is sensed while the touch screen is in an inactive state and the sensed temperature of the object satisfies a preset temperature condition, the controller 180 may switch the inactive state to an active state of the touch screen to acquire an image of the object.

On the other hand, when an image acquired through the image sensor 300 does not correspond to pre-registered user authentication information as a result of the determination, the process of maintaining the locked state is carried out.

When the image acquired through the image sensor 300 does not correspond to pre-registered user authentication information, the controller 180 may control the image sensor 300 to acquire the image of the object again. As the user authentication fails, the process of acquiring the image of the object again may be repeated a preset number of times.

Furthermore, when the image acquired through the image sensor 300 does not correspond to pre-registered user authentication information, the controller 180 may perform another authentication method other than the image acquisition method. For example, the controller 180 may perform at least one of a voice recognition process, a fingerprint recognition process, a pattern input process, and a password input process. The controller 180 may display notification information indicating that another authentication method is carried out on the touch screen.

On the other hand, when the acquired image of the object is not an image of the pre-registered user, the controller 180 may display notification information indicating that the image authentication process has failed on the touch screen.

As described above, according to a mobile terminal in accordance with the present disclosure and a control method thereof, a user may release the locked state of the terminal and enter a home screen page only by locating his or her body part on the terminal body without direct contact with the terminal.

Furthermore, according to a mobile terminal in accordance with the present disclosure and a control method thereof, an unlocking step may be divided into a plurality of steps (a temperature sensing step and an image acquisition step) to accurately know a user's intention to use the terminal. Accordingly, when a user approaches the terminal with no intention to use the terminal, it may be possible to prevent the terminal from being unlocked unnecessarily.

Moreover, according to a mobile terminal in accordance with the present disclosure and a control method thereof, it may be possible to more accurately determine a user's intention to whether an object has approached to release an unlocked state by determining whether a shape corresponding to pre-registered user authentication information as well as a temperature of the object through the temperature sensor has been sensed.

Meanwhile, a mobile terminal according to the present disclosure may further include a temperature sensor as well as a motion sensor (for example, an acceleration sensor) for sensing the motion of the main body.

Figure 8A:
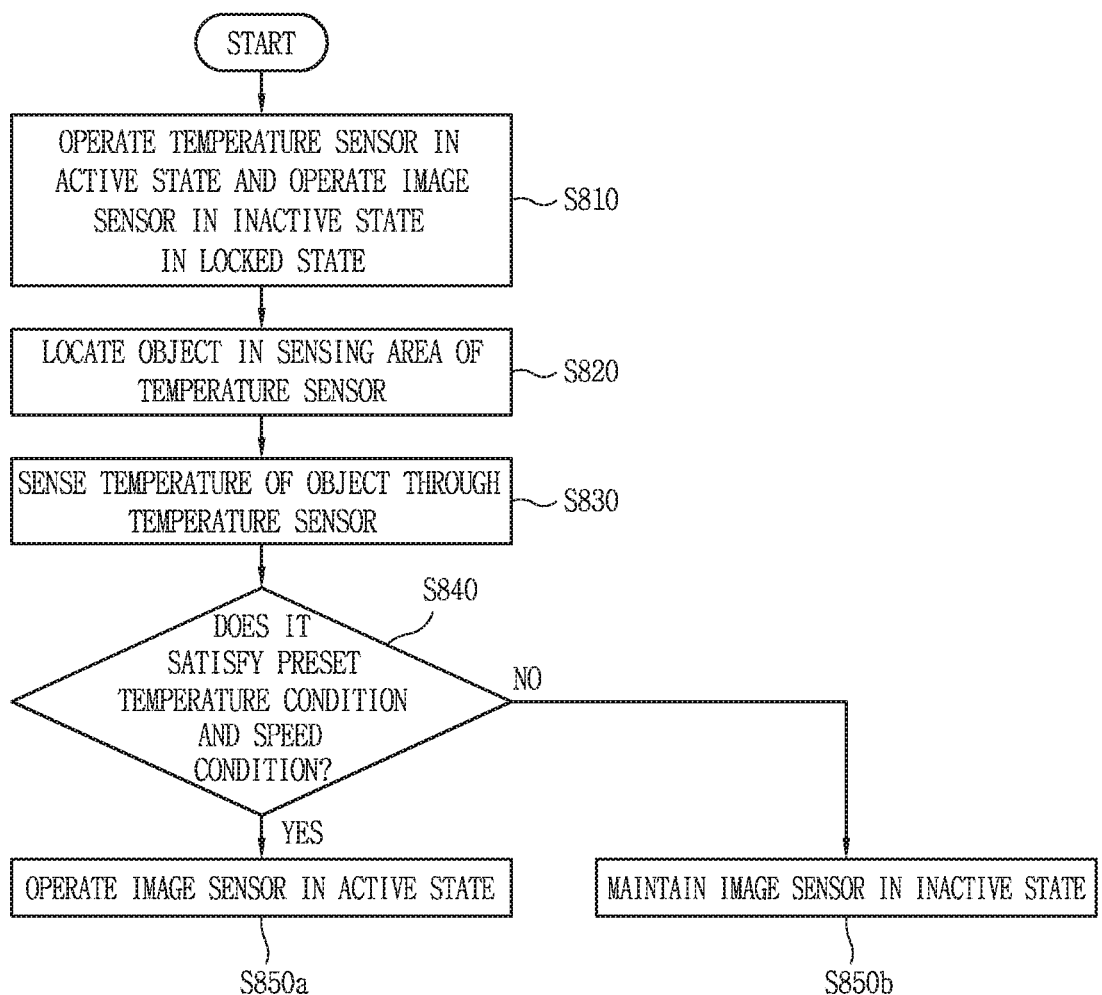

In a mobile terminal according to the present disclosure, the process for performing unlocking may be carried out depending on whether or not the motion of the terminal satisfies a preset motion condition, particularly, using an acceleration sensor in addition to whether or not the temperature of an object satisfies a preset condition through the temperature sensor. It is to accurately perceive a user's intention desired to use the terminal through the motion sensing of the terminal. Hereinafter, a method of releasing the locked state in consideration of the motion of the terminal as well will be described in more detail with reference to the accompanying drawings. FIGS. 8A and 8B are conceptual views for explaining a method of controlling a locked state using a temperature sensor and an acceleration sensor according to the present disclosure.

First, in the present disclosure, the process of operating the temperature sensor 200 in an unlocked state and the image sensor 300 in an inactive state is performed is carried out (S810).

In the locked state, the touch screen may have any one of i) an active state (the illumination of the touch screen is turned on), ii) an inactive state (the illumination of the touch screen is turned off), iii) an AOD (Always on Display) state (only part of the touch screen is activated, and information is displayed in only a part thereof).

In the present disclosure, the controller 180 may operate the temperature sensor 200 in an active state regardless of the state of the touch screen in a locked state. Accordingly, the temperature sensor 200 may be operated in an active state even when the touch screen is turned off or partially turned on to sense the temperature of an object located in the vicinity of the main body.

In the locked state, the temperature sensor 200 is continuously operated in an activated state, thereby sensing the temperature of an object located in the vicinity of the temperature sensor 200. When an object is located in the sensing area of the temperature sensor 200 while operating the temperature sensor 200 in an active state (S820), the temperature sensor 200 performs the process of sensing the temperature of the object located in the sensing area (S830).

Here, the sensing area of the temperature sensor 200 may be referred to as a field of view (FOV).

When the temperature of the object is sensed by the temperature sensor 200, the process of determining whether the sensed temperature of the object satisfies a preset temperature condition and the process of determining whether the motion speed of the terminal satisfies a preset speed condition are carried out (S840).

First, the controller 180 determines whether temperature sensed by the temperature sensor 200 satisfies a preset temperature condition. Here, the preset temperature condition may be determined under the control of the controller 180 or the user, and for an example, the preset temperature condition may be whether or not a temperature sensed through the temperature sensor 200 satisfies a typical human body temperature range.

For example, the preset temperature condition may be "whether the sensed temperature of the object is in a range of 30° C. to 36° C.

In other words, in the present disclosure, when an object located in the vicinity of the sensing area 250 of the temperature sensor 200 has a temperature corresponding to a user's body, it may be possible to estimate that the user approaches the vicinity of the terminal for the use of the terminal. Furthermore, based on this estimation, the control of the terminal may be carried out.

Moreover, a mobile terminal according to the present disclosure may determine whether the terminal has been moved to satisfy a preset speed condition. For example, the user can move the terminal subsequent to holding the terminal in his/her hand to use the terminal, and in the locked state, the controller 180 may sense the motion speed of the terminal using the acceleration sensor.

In other words, in the locked state, the acceleration sensor and the temperature sensor may maintain an active state.

Accordingly, when the terminal is moved by the user as illustrated in (a) of FIG. 8B, the acceleration sensor may sense the motion speed of the terminal. Then, the temperature sensor may sense the object (for example, the temperature of the user) as illustrated in (b) of FIG. 8B.

The temperature sensor and the acceleration sensor may be operated to continuously maintain an active state in the locked state. On the contrary, the temperature sensor may be activated only when the motion of the terminal is sensed. At this time, the temperature sensor may also be activated only when the motion speed according to the motion of the terminal satisfies a preset speed condition.

On the other hand, when the motion of the object and the terminal satisfying a preset temperature condition satisfies a preset speed condition as a result of the determination in step S840, the process of operating the image sensor in an active state is carried out (S850a).

Furthermore, on the contrary, at least one of the preset temperature condition and the preset speed condition is not satisfied as a result of the determination in step S840, the process of operating the image sensor in an inactive state is carried out (S850b).

In other words, in this case, the image sensor 300 may continuously maintain the inactive state. As described above, the operating status of the image sensor 300 in the locked state may be operated in either one of the active state and the inactive state while the temperature sensor 200 is operated in the active state.

While the image sensor 300 is operated in the inactive state in the locked state, the temperature sensor 200 may be operated in the active state, and when an object satisfying a preset temperature condition is sensed by the temperature sensor 200, the operating status may be changed from the inactive state to the active state.

In other words, the image sensor 300 is activated to acquire the image of the object only when the motion of the object and the terminal satisfying a preset temperature condition satisfies a preset speed condition.

Accordingly, when a preset temperature and speed condition is not satisfied as a result of the determination in step S840, the image sensor 300 may continuously maintain an inactive state.

On the other hand, when an object satisfying a preset temperature condition is sensed and the motion of the terminal satisfies a preset speed condition as a result of the determination in step S840, the process of operating the image sensor 300 in an active state is carried out (S850a). In other words, the operating status of the image sensor 300 being operated in an inactive state in the locked state may be changed to an activated state.

Then, the process of acquiring an image of the object by the image sensor 300 is carried out. When an object satisfying a preset temperature condition is sensed and the motion of the terminal satisfies a preset speed condition by the temperature sensor 200 and the acceleration sensor, the controller 180 may generate an event (or a trigger signal) for activating the image sensor 300. Then, based on such an event, the image sensor 300 that has been operated in an inactive state in the locked state may be operated in an active state.

As illustrated above in FIG. 3, the temperature sensor and the image sensor may be arranged in proximity to each other such that a sensing area of the temperature sensor and a sensing area of the image sensor overlap with each other.

In other words, the temperature sensor 200 and the image sensor 300 may be arranged in proximity to each other, and thus as illustrated in FIG. 3, at least part of a sensing area (a) of the temperature sensor 200 and a sensing area (b, c) of the image sensor 300 may form an area (b', c') overlapping with each other.

The image sensor 300 may acquire an image of at least part of an image of an object located in the sensing area (b', c') in which the sensing areas (b, c) of the image sensor 300 overlaps with the sensing area (a) of the temperature sensor 200 among objects located in the sensing area (a) of the temperature sensor 200. As a result, an image of an object may be acquired by the image sensor 300 while sensing the temperature of the object through the temperature sensor 200.

Meanwhile, when the image of the object is acquired through the temperature sensor, the process of determining whether the acquired image corresponds to pre-registered user authentication information is carried out.

When an image acquired through the image sensor 300 corresponds to the pre-registered user authentication information as illustrated in (c) of FIG. 8B, the controller 180 may switch an locked state of the terminal to an unlocked state.

Here, the pre-registered user authentication information may be an image corresponding to a user's body part. For example, the pre-registered user authentication information may be an image corresponding to any one of various body parts such as a user's face image, a palm image, a hand image, and the like. Furthermore, the pre-registered user authentication information may be a user's vein information. In this case, the image sensor 300 may be configured to acquire the user's vein image.

Meanwhile, when an image acquired through the image sensor 300 corresponds to pre-registered user authentication information as a result of the determination, the process of switching a locked state to an unlocked state is carried out. When an image acquired through the image sensor 300 corresponds to pre-registered user authentication information, the controller 180 may switch the locked state of the terminal to the unlocked state.

Meanwhile, during the above process, the touch screen may continuously maintain an inactive state. In other words, the controller 180 may perform the temperature sensing and image sensing of the object while the touch screen is in an inactive state. In this case, when the locked state is switched to the unlocked state, the controller 180 may switch the touch screen to an active state to display information.

The controller 180 may display preset information to be displayed in the unlocked state. The information may be a home screen page, a specific mode screen, or an execution screen of a preset application.

Here, the home screen page refers to a screen on which an icon of an application installed in the mobile terminal is output, and means a screen that is output as default when the locked state of the terminal is changed to the unlocked state.

Furthermore, the temperature sensing, the speed sensing, and image sensing may be carried out even while the touch screen is in an active state. In other words, when the temperature of the object and the motion speed of the terminal are sensed in the locked state in which the touch screen is activated, the controller 180 may perform image sensing while maintaining the active state of the touch screen.

Furthermore, when the temperature of the object and the speed of the terminal are sensed while the touch screen is in an inactive state, and the motion of the terminal satisfies a speed condition while at the same time the sensed temperature of the object satisfies a preset temperature condition, the controller 180 may switch the inactive state to an active state of the touch screen to acquire an image of the object.

On the other hand, when an image acquired through the image sensor 300 does not correspond to pre-registered user authentication information as a result of the determination, the process of maintaining the locked state is carried out.

When the image acquired through the image sensor 300 does not correspond to pre-registered user authentication information, the controller 180 may control the image sensor 300 to acquire the image of the object again. As the user authentication fails, the process of acquiring the image of the object again may be repeated a preset number of times.

Furthermore, when the image acquired through the image sensor 300 does not correspond to pre-registered user authentication information, the controller 180 may perform another authentication method other than the image acquisition method. For example, the controller 180 may perform at least one of a voice recognition process, a fingerprint recognition process, a pattern input process, and a password input process. The controller 180 may display notification information indicating that another authentication method is carried out on the touch screen.

On the other hand, when the acquired image of the object is not an image of the pre-registered user, the controller 180 may display notification information indicating that the image authentication process has failed on the touch screen.

Meanwhile, in the above embodiment, an example of activating the image sensor based on the temperature condition of the object and the speed condition of the terminal has been described, but it will be apparent to those skilled in the art that the step S840 can be carried out as described above with reference to FIGS. 7A and 7B, and the detailed description thereof will be substituted by the earlier description of FIGS. 7A and 7B.

As described above, according to a mobile terminal in accordance with the present disclosure and a control method thereof, an unlocking step may be divided into a plurality of steps (a temperature sensing step and an image acquisition step) to accurately know a user's intention to use the terminal. Accordingly, when a user approaches the terminal with no intention to use the terminal, it may be possible to prevent the terminal from being unlocked unnecessarily.

Moreover, in a mobile terminal according to the present disclosure, the process for performing unlocking may be carried out depending on whether or not the motion of the terminal satisfies a preset motion condition, particularly, using an acceleration sensor in addition to whether or not the temperature of an object satisfies a preset condition through the temperature sensor. Accordingly, it may be possible to more accurately perceive a user's intention desired to use the terminal through the motion sensing of the terminal, thereby preventing the unlocking process of the terminal from being carried out unnecessarily.

In the above example, a method of activating an image sensor when the temperature of an object is sensed using a temperature sensor, and the sensed temperature satisfies a preset temperature condition has been described. In the present disclosure, as described above, the temperature sensor may be implemented with an IR camera. In other words, the temperature sensor may be a thermal image sensor (or camera). When the temperature sensor of the present disclosure is a thermal image sensor, it is possible to perceive even the shape of the object as well. For an example, the temperature sensor 200 of the present disclosure may be implemented with an infrared (IR) thermal sensor.

Here, according to the present disclosure, both the temperature and shape of an object located in the sensing area (or field of view (FOV) of the temperature sensor may be perceived to perform a process for releasing the locked state. In this case, in the present disclosure, the gesture of an object may be sensed using the temperature sensor to switch the locked state to the unlocked state using the gesture of the object using the temperature sensor.

Figure 9A:
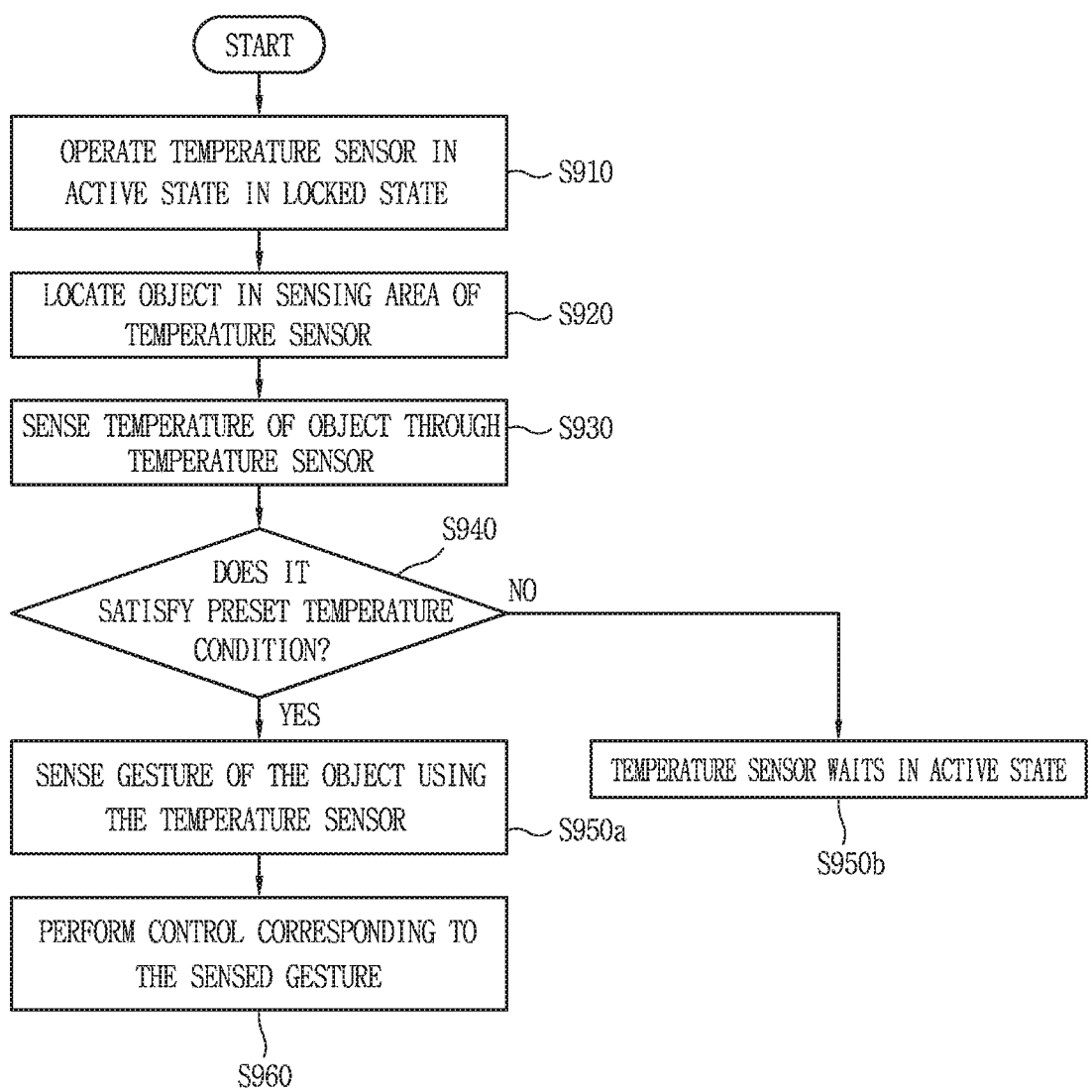
FIGS. 9A and 9B are conceptual views for explaining a user gesture using a temperature sensor according to the present disclosure.
Figure 9B:
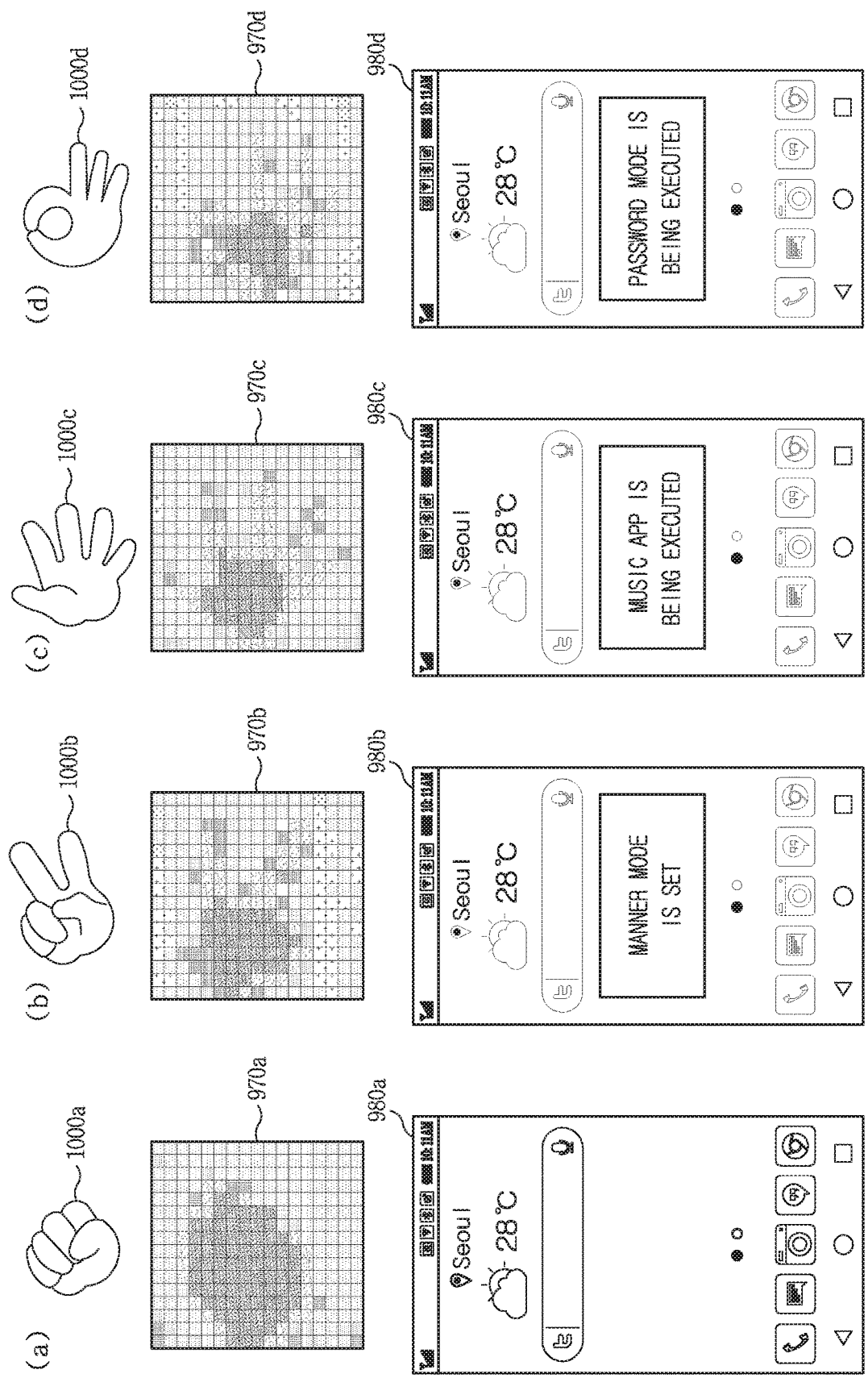

Hereinafter, a method of releasing the locked state in consideration of the shape of the object as well will be described in more detail with reference to the accompanying drawings. FIGS. 9A and 9B are conceptual views for explaining a user gesture using a temperature sensor according to the present disclosure.

First, in the present disclosure, the process of operating the temperature sensor 200 in an active state in the locked state is carried out (S910).

In the locked state, the touch screen may have any one of i) an active state (the illumination of the touch screen is turned on), ii) an inactive state (the illumination of the touch screen is turned off), iii) an AOD (Always on Display) state (only part of the touch screen is activated, and information is displayed in only a part thereof).

In the present disclosure, the controller 180 may operate the temperature sensor 200 in an active state regardless of the state of the touch screen in a locked state. Accordingly, the temperature sensor 200 may be operated in an active state even when the touch screen is turned off or partially turned on to sense the temperature of an object located in the vicinity of the main body.

In the locked state, the temperature sensor 200 is continuously operated in an activated state, thereby sensing the temperature of an object located in the vicinity of the temperature sensor 200. When an object is located in the sensing area of the temperature sensor 200 while operating the temperature sensor 200 in an active state (S920), the temperature sensor 200 performs the process of sensing the temperature of the object located in the sensing area (S930).

Here, the sensing area of the temperature sensor 200 may be referred to as a field of view (FOV).

When the temperature of the object is sensed by the temperature sensor 200, the process of determining whether the sensed temperature of the object satisfies a preset temperature condition is carried out (S940).

First, the controller 180 determines whether temperature sensed by the temperature sensor 200 satisfies a preset temperature condition. Here, the preset temperature condition may be determined under the control of the controller 180 or the user, and for an example, the preset temperature condition may be whether or not a temperature sensed through the temperature sensor 200 satisfies a typical human body temperature range.

For example, the preset temperature condition may be "whether the sensed temperature of the object is in a range of 30° C. to 36° C.

In other words, in the present disclosure, when an object located in the vicinity of the sensing area 250 of the temperature sensor 200 has a temperature corresponding to a user's body, it may be possible to estimate that the user approaches the vicinity of the terminal for the use of the terminal. Furthermore, based on this estimation, the control of the terminal may be carried out. In other words, in the present disclosure, even when the user does not apply any artificial manipulation such as applying a touch to the terminal, pressing the button, or moving the terminal, the controller may determine that the user wants to proceed with the process for controlling the locked state only with an operation of taking his or her hand, face or the like to the vicinity of the terminal.

On the other hand, when the object satisfies a preset temperature condition as a result of the determination in step S940, the process of sensing the gesture of the object is carried out (S950*a*). On the other hand, it is also possible that temperature and gesture sensing of the object are carried out at the same time.

Here, the gesture of the object may have a meaning including a movement distance of the object, a relative height between the object and the terminal, and a movement of the object.

In this manner, when the gesture of the object is sensed as in the process of S950*a*, control corresponding to the sensed gesture is carried out (S960).

For example, when the gesture of the object corresponds to a preset gesture for switching a locked state to an unlocked state, the controller 180 may switch the locked state to the unlocked state.

Furthermore, when the object does not satisfy a preset temperature condition as a result of the determination in step S940, the locked state is maintained as it is, and the temperature sensor continuously maintains an active state (S950*b*). In other words, the temperature sensor may wait in the locked state with the activated state.

Meanwhile, when the object satisfies a preset temperature condition, the controller 180 may control the types of screens displayed on the touch screen in the unlocked state differently according to the shape of the acquired object.

In other words, the controller 180 may sense the shape and motion of the object using the temperature sensor, and determine the gesture of the object using them.

In the memory, matching information in which different screen information or mode information according to each gesture is matched may be stored. The controller 180 may display screen information according to the sensed gesture of the object or execute an operation mode with reference to the matching information stored in the memory.

For example, as illustrated in (a) of FIG. 9B, when the temperature distribution of an object sensed through the temperature sensor is analyzed to sense a first gesture, the controller 180 may extract operation information according to the sensed first gesture.

Such operation information may be extracted from the above-described matching information. For example, when the matching information includes information "execute an operation of releasing a locked state and display a home screen page when a first gesture is sensed," the controller 180 may displays a home screen page as illustrated in the drawing.

For another example, as illustrated in (b) of FIG. 9B, when the temperature distribution of an object sensed through the temperature sensor is analyzed to sense a second gesture, the controller may extract operation information according to the sensed second gesture.

Such operation information may be extracted from the above-described matching information. For example, when the matching information includes information "release a locked state and execute a manner mode when a second gesture is sensed," the controller 180 may release the locked state as illustrated in the drawing, and control the terminal to operate in a manner mode.

For still another example, as illustrated in (c) of FIG. 9B, when the temperature distribution of an object sensed through the temperature sensor is analyzed to sense a third gesture, the controller may extract operation information according to the sensed third gesture.

Such operation information may be extracted from the above-described matching information. For example, when the matching information includes information "release a locked state and execute a music application when a second gesture is sensed," the controller 180 may release the locked state as illustrated in the drawing, and execute the music application.

For yet still another example, as illustrated in (d) of FIG. 9B, when the temperature distribution of an object sensed through the temperature sensor is analyzed to sense a fourth gesture, the controller may extract operation information according to the sensed fourth gesture.

Such operation information may be extracted from the above-described matching information. For example, when the matching information includes information "release a locked state and execute a password mode when a fourth gesture is sensed," the controller 180 may release the locked state as illustrated in the drawing, and execute the password mode. Here, the password mode is an operation mode in which the user's privacy enhanced, and a mode in which information that is accessible only when a preset gesture such as a specific gesture or preset authentication information is authenticated is output.

Meanwhile, although not shown, the controller 180 may control the operation of a specific function or a specific application without switching the locked state to the unlocked state when a preset gesture is sensed through the temperature sensor.

For example, when a preset gesture is sensed through the temperature sensor, the controller 180 may execute a music application while maintaining the terminal in a locked state. In this case, music may be played in the locked state. When the touch screen is in an inactive state at the time of unlocking, the touch screen may continuously maintain an inactive state even if the music application is executed.

As described above, a mobile terminal according to the present disclosure and a control method thereof may perform an input method of control command in various ways by sensing the temperature and gesture of an object using the temperature sensor, and control a function of the terminal without touching or manipulating the terminal with only a gesture in a sensing area of the temperature sensor. As a result, user convenience may be improved.

Figure 10A:
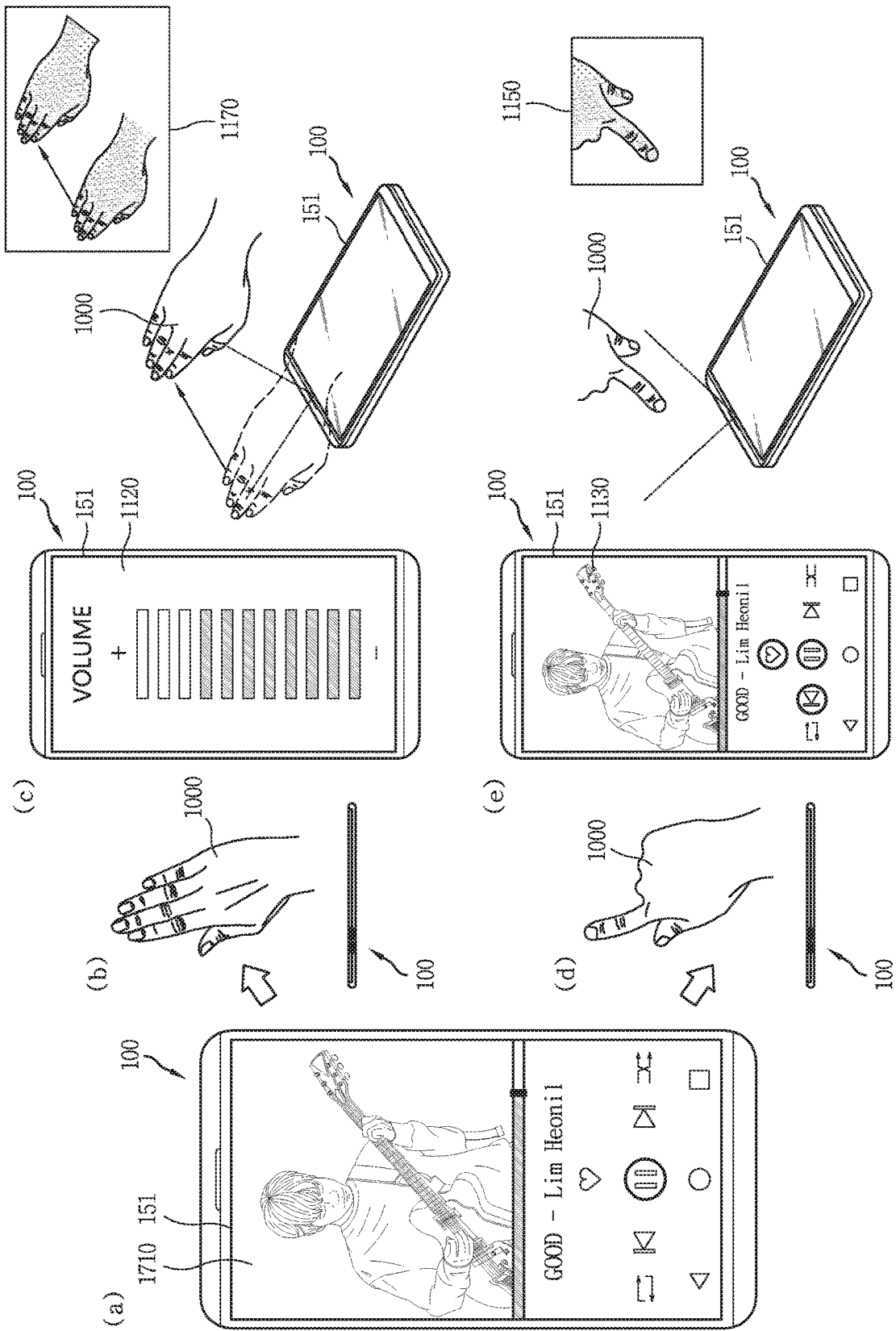
FIGS. 10A and 10B are conceptual views for explaining a method of controlling a function of a terminal using a temperature sensor according to the present disclosure.
Figure 10B:
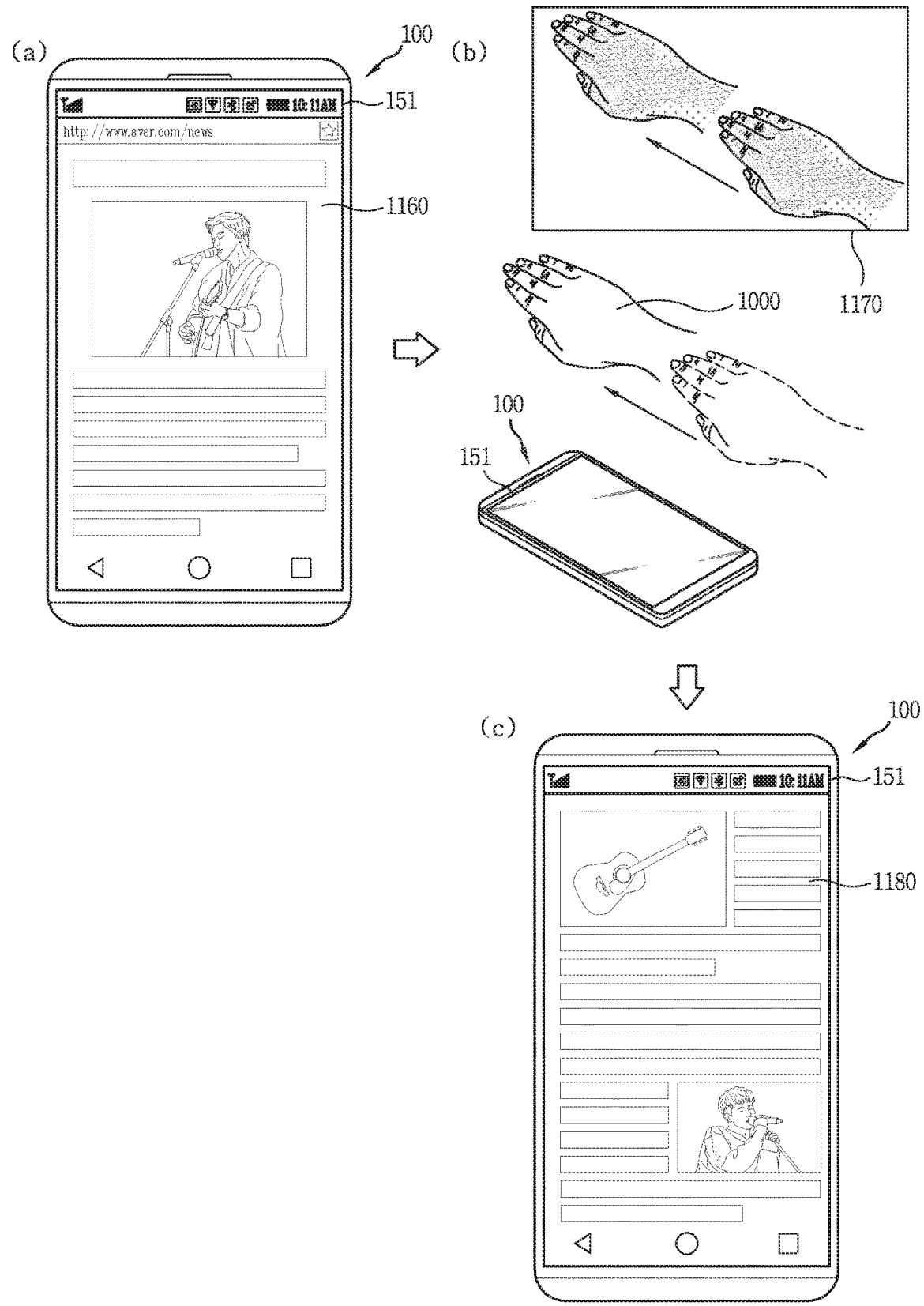

In the above embodiments, a method of releasing a locked state using the temperature sensor has been described. However, a mobile terminal according to the present disclosure may analyze the temperature distribution of an object sensed through the temperature sensor to sense a gesture of the object, and use the sensed gesture as a control command of the terminal. Hereinafter, a method of controlling a terminal using a gesture sensed through a temperature sensor will be described in detail with reference to the accompanying drawings. FIGS. 10A and 10B are conceptual views for explaining a method of controlling a function of a terminal using a temperature sensor according to the present disclosure.

As described above, a mobile terminal according to the present disclosure may analyze the temperature distribution of an object sensed through the temperature sensor to sense a gesture of the object, and use the sensed gesture as a control command of the terminal.

Such a control command may be used for the control of the terminal when the terminal is in an unlocked state. For example, the controller 180 may sense the gesture of an object using the temperature sensor, and perform control corresponding to the sensed gesture. The control may be a control associated with screen information displayed on the touch screen 151. Which control is to be carried out with which gesture may be based on matching information associated with a gesture stored in the memory.

For example, in a state that an execution screen 1710 of a music-related application is displayed as shown in (a) of FIG. 17, when the object 1000 is sensed as illustrated in (b) of FIG. 17, and a preset gesture (for example, a gesture moving in one direction) of the object 1000 is sensed as illustrated in (c) of FIG. 17, the controller 180 may process it as a control command of volume function. The controller 180 may increase or decrease a volume of the speaker based on the motion of the object 1000 sensed through the temperature sensor 200.

Such a gesture of the object 1000 may be used similarly in adjusting the volume of the mobile terminal not only when an execution screen of a music-related application is displayed but also when another type of screen is displayed on the touch screen.

Meanwhile, the type of gesture may be modified in various ways, and in the present disclosure, different functions may be assigned to different gestures of the object, thereby controlling the function of the terminal only by the gesture of the object.

For another example, as illustrated in (d) and (e) of FIG. 17, when the object takes a gesture of seemingly indicating something, the controller 180 may recognize it as a gesture of selecting content or an icon on a screen displayed on the touch screen 151.

In this case, the controller 180 may highlight and display selectable icons, thereby guiding information on which icons are selectable for the user. Moreover, when an additional gesture for selecting a specific icon is applied by the object 1000 in a state that a specific icon is indicated, the controller 180 may execute a function corresponding to the specific icon.

As described above, in the mobile terminal according to the present disclosure, the controller may control the terminal using a user's gesture, thereby controlling the terminal without directly touching the terminal.

For still another example, as illustrated in (a) and (b) of FIG. 10B, a upward and downward movement of the object 1000 may be processed as a command for scrolling information displayed on the touch screen. Accordingly, as illustrated in (a) of FIG. 10B, when it is sensed that the object 1000 moves with respect to a longitudinal direction of the terminal while screen information 1160 is displayed, the controller 180 may perform scroll on information displayed on the touch screen as illustrated in (c) of FIG. 10B.

Although not shown, when a gesture of the object in a width direction is sensed while a home screen page is displayed on the touch screen 151, the controller 180 may switch the currently displayed home screen page to another home screen page.

On the other hand, when the gesture of an object is sensed using the temperature sensor, the controller 180 may activate the temperature sensor with a larger number of pixels compared to when the temperature of the object is sensed using the temperature sensor, thereby improving the accuracy of the gesture sensing.

In addition, in a mobile terminal according to the present disclosure, the controller 180 may activate a gesture sensing mode when a preset gesture of an object is sensed. In other words, when the preset gesture is sensed, the controller 180 may process a gesture according to the motion of the object as a control command.

As described above, according to a mobile terminal in accordance with the present disclosure and a control method thereof, it may be possible to sense a user's gesture located in a three-dimensional space using the temperature sensor and perform a function corresponding to the gesture. Therefore, the user may have convenience capable of controlling the mobile terminal without directly touching or manipulating the terminal.

Furthermore, a mobile terminal according to the present disclosure may be configured to sense the temperature of an object in a locked state or an unlocked state, and when the object corresponds to a pre-registered user's body part, the sensed temperature information of the object may be stored as the user's body temperature information. The stored user's body temperature information may be used for a health care function.

As described above, according to a mobile terminal in accordance with the present disclosure and a control method thereof, it may be possible to sense a user's body located in the vicinity of a terminal body through a temperature sensor operating in an active state in a locked state. When the user's body is sensed, a process for releasing a locked state is carried out. Therefore, according to the present disclosure, a process for releasing a locked state may be carried out with no user's operation of manipulating the terminal or moving the terminal to release the locked state. As a result, according to a mobile terminal in accordance with the present disclosure and a control method thereof, a user may control the locked state of the terminal only by locating the user's body around the terminal body, thereby enhancing user convenience.

Moreover, a mobile terminal in accordance with the present disclosure and a control method thereof may sense a user body in the vicinity of the terminal, and then activate an image sensor for acquiring an image corresponding to the user's body, thereby reducing power consumption compared to when the image sensor is continuously activated.

Moreover, according to a mobile terminal in accordance with the present disclosure and a control method, it may be possible to recognize whether a user's body part is a body part used for user authentication based on a shape of a region where a temperature corresponding to the user's body is sensed. Therefore, an image sensor may be selectively activated according to the recognition result. As a result, even when the user's body is sensed, it may be possible to reduce unnecessary power consumption by deactivating the image sensor when the sensed user's body is not a body part for user authentication.

What is claimed is:

1. A mobile terminal, comprising:
a body;
a first sensor coupled to the body and configured to sense temperature of an object located relative to the body, wherein the first sensor includes an active state and an inactive state;
a second sensor coupled to the body and configured to acquire an image of the object, wherein the second sensor includes an active state, and an inactive state which occurs during a locked state; and
a controller configured to:
operate the first sensor in the active state to sense the temperature of the object, while in the locked state and while the second sensor is in the inactive state;
operate the second sensor in the active state and control the second sensor to acquire the image of the object, when the temperature of the object sensed by the first sensor satisfies a defined condition; and
switch from the locked state to an unlocked state, when the acquired image satisfies a defined condition.

2. The mobile terminal of claim 1, further comprising:
a touchscreen located on a front side of the body,
wherein the controller is further configured to:
control operating status of the first sensor to be in the active state, while the touchscreen is in an inactive state, and
operate the first sensor to sense the temperature of the object when the object is located within a first sensing area of the first sensor.

3. The mobile terminal of claim 2, wherein operating status of the second sensor while in the locked state varies depending on whether the sensed temperature of the object satisfies the defined condition.

4. The mobile terminal of claim 3, wherein the controller is further configured to:
maintain the operating status of the second sensor in the inactive state, while in the locked state and while the first sensor is operated in the active state; and
switch the second sensor from the inactive state to the active state when the temperature of the object satisfies the defined condition.

5. The mobile terminal of claim 2, wherein the first sensing area of the first sensor and a second sensing area of the second sensor at least partially overlap,
wherein the controller is further configured to:
control the second sensor to acquire the image, when the object is located at an area within which the first sending area and the second sensing area overlap.

6. The mobile terminal of claim 1, wherein the controller is further configured to:
identify a shape of the object based on the acquired image, wherein the shape of the object corresponds to an area in which the temperature of the object is sensed.

7. The mobile terminal of claim 6, wherein the controller is further configured to:
switch from the locked state to the unlocked state, when the acquired image satisfies the defined condition, wherein the defined condition is the identified shape of the object matching a defined shape.

8. The mobile terminal of claim 6, further comprising:
a touchscreen located on a front side of the body,
wherein the controller is further configured to:
cause the touchscreen to display any of a plurality of screens according to the identified shape of the object after switching from the locked state to the unlocked state, wherein each of the plurality of screens is associated with a different shape.

9. The mobile terminal of claim 1, wherein the first sensor comprises a plurality of temperature sensor pixels, and
at least some of the plurality of temperature sensor pixels maintain an active state while in the locked state.

10. The mobile terminal of claim 9, wherein the controller is further configured to:
determine number and location of pixels to be activated, among the plurality of temperature sensor pixels, according to a type of information to be acquired by the first sensor while in the locked state.

11. A mobile terminal, comprising:
a body;
a touchscreen located on a front side of the body;
a first sensor coupled to the body and configured to sense temperature of an object located relative to the body, wherein the first sensor includes an active state and an inactive state;
a second sensor coupled to the body and configured to acquire an image of the object, wherein the second sensor includes an active state, and an inactive state which occurs during a locked state; and
a controller configured to:
switch from the locked state to an unlocked state, when the acquired image of the object corresponds to pre-registered user authentication information,
wherein the first sensor senses the temperature of the object, while in the locked state and while the second sensor is in the inactive state; and
wherein the second sensor switches from the inactive state to the active state to acquire the image of the object while in the locked state, when the temperature of the object sensed by the first sensor satisfies a preset temperature condition.

12. The mobile terminal of claim 11, further comprising:
a third sensor configured to sense motion of the body,
wherein the controller is further configured to:
determine whether a motion satisfying a preset condition is sensed by the third sensor, and
control the second sensor to acquire the image, when the motion satisfying the preset condition is sensed as a result of the determination, and when the temperature of the object satisfies the preset temperature condition.

13. The mobile terminal of claim 11, wherein the first sensor comprises a plurality of temperature sensor pixels, and
the second sensor comprises a plurality of image sensor pixels, and
each of the plurality of temperature sensor pixels is respectively disposed between image sensor pixels of the plurality of image sensor pixels.

14. A method for controlling a terminal having a touchscreen, the method comprising:
sensing, by a temperature sensor, temperature of an object located relative to a body of the terminal, wherein the sensing occurs while in a locked state and while an image sensor is in an inactive state, wherein the temperature sensor includes an active state and an inactive state;
acquiring, by the image sensor, an image of the object when the temperature of the object sensed through the temperature sensor satisfies a defined condition, wherein the image sensor includes an active state and the inactive state, wherein the inactive state occurs during the locked state; and switch from the locked state to an unlocked state, when the acquired image satisfies a defined condition.

15. The method of claim 14, further comprising:
identifying a shape of the object based on the acquired image, wherein the shape of the object corresponds to an area in which the temperature of the object is sensed.

16. The method of claim 15, further comprising:
switching from the locked state to the unlocked state, when the acquired image satisfies the defined condition, wherein the defined condition is the identified shape of the object matching a defined shape.

17. The method of claim 14, wherein the temperature sensor senses the temperature of an object located relative to the both while the touchscreen is in an inactive state.

18. The method of claim 14, wherein the temperature sensor comprises a plurality of temperature sensor pixels, and
at least some of the plurality of temperature sensor pixels maintain an active state in the locked state.

19. The method of claim 18, further comprising:
determine number and location of pixels to be activated, among the plurality of temperature sensor pixels, according to a type of information to be acquired by the temperature sensor while in the locked state.

* * * * *